US005577124A

United States Patent [19]
Anshel et al.

[11] Patent Number: 5,577,124
[45] Date of Patent: Nov. 19, 1996

[54] MULTI-PURPOSE HIGH SPEED CRYPTOGRAPHICALLY SECURE SEQUENCE GENERATOR BASED ON ZETA-ONE-WAY FUNCTIONS

[75] Inventors: Michael M. Anshel, New York, N.Y.; Dorian Goldfeld, Tenafly, N.J.

[73] Assignee: Arithmetica, Inc., Wilmington, Del.

[21] Appl. No.: 400,928

[22] Filed: Mar. 9, 1995

[51] Int. Cl.⁶ .................................................. H04L 9/00
[52] U.S. Cl. ............................ 380/46; 380/25; 380/30; 364/224.21
[58] Field of Search ............................. 380/3, 4, 21, 23, 380/25, 28, 30, 46, 49; 364/224.21, 717; 331/78

[56] References Cited

U.S. PATENT DOCUMENTS

| | | | |
|---|---|---|---|
| 4,200,770 | 4/1980 | Hellman et al. | |
| 4,405,829 | 9/1983 | Rivest et al. | |
| 5,159,632 | 10/1992 | Crandall | 380/30 |
| 5,272,755 | 12/1993 | Miyaji et al. | 380/30 |
| 5,373,558 | 12/1994 | Chaum | 380/23 |

OTHER PUBLICATIONS

"Zeta Functions, One–Way Functions, and Cryptography," M. Anshel and D. Goldfeld. A.M.S. Abstracts, vol. 15, No. 3, Apr. 1994, p. 349, #892–11–157.
"Open Problems in Number Theoretic Complexity, II," L. Adleman and K. McCurley. *Algorithmic Number Theory*, 1st Intl. Symposium, ANTS–I, May 6–9, 1994.
*The Codebreakers: The Story of Secret Writing*, pp. 394–396. David Kahn.
*Communication Theory of Secrecy Systems*, journal pp. 657–715. C. E. Shannon. Entire Manuscript provided.
"An Extension of the Shannon Theory Approach to Cryptography," C. E. Shannon. *IEEE Transactions on Information Theory*, vol. IT–23, No. 3 May 1977, pp. 289–294.
"Cryptography," Ronald L. Rivest. *Handbook of Theoretical Computer Science, Volume A: Algorithms & Complexity*, 1994. pp. 721–738.

"How To Generate Cyrptographically Strong Sequences of Pseudo–Random Bits," M. Blum and S. Micali, *SIAM Journal on Computing*, vol. 13, No. 4 (1984).
"One Way Functions and Pseudorandom Generators," L. A. Levin. *Combinatorica* 7, 1987, pp. 357–363.
"New Directions in Cryptography," W. Diffie and M. Hellman. *IEEE Transactions on Information Theory*, vol. IT–22, No. 6, Nov. 1976, pp. 644–654.
"A Method for Obtaining Digital Signatures and Public–Key Cryptosystems." R. L. Rivest, A. Shamir and L. Adleman, Communications of the ACM 21, 1978, pp. 120–126.
"Odds and Ends from Cryptology and Computational Number Theory," K. McCurley. *Cryptology and Computational Number Theory*, 1990, p. 162.
"Probabilistic Encryption," S. Goldwasser and S. Micali. *Journal of Computer and System Sciences* 26(2), 1984, pp. 270–299.
"On the Randomness of Legendre and Jacobi Sequences," I. V. Damgard. *Advances in Cryptology (Proceedings of Crypto '88)*, Lecture Notes in Computer Science, 1990, pp. 163–172.

*Primary Examiner*—David C. Cain
*Attorney, Agent, or Firm*—Fulbright & Jaworski LLP

[57] ABSTRACT

A method is disclosed whereby a high performance, high integrity, cryptographically secure sequence generator based on zeta one-way functions is specified for pseudorandom sequence generation, authentication, key transfer by public discussion, and message transmission by public-key encryption. The method encompasses a new one-way function with trapdoor based on Artin reciprocity in an algebraic number field. Public keys are pseudorandom sequences based on zeta one-way functions. In the simplest instance of this method, public keys are quadratic signatures, i.e. special sequences of Jacobi symbols. The generation, transfer, and sharing of private keys is a process based on the law of quadratic reciprocity. The computational complexity of the quadratic signature problem provides the foundation for the cryptographic security of this method. This new trapdoor one-way function is distinct from constructions in the prior art.

55 Claims, 15 Drawing Sheets

MULTI-PURPOSE HIGH SPEED CRYPTOGRAPHICALLY SECURE SEQUENCE GENERATOR BASED ON ZETA-ONE-WAY FUNCTIONS

BACKGROUND OF THE INVENTION

1. Field of the Invention

The present invention relates to the generation of cryptographically secure sequences at very high speed. More particularly, this invention relates to the generation of such sequences with predetermined probability distribution with cryptographic security based on zeta-one-way functions with applications to authentication, key transfer, and public-key cryptography.

2. Description of the Prior Art

In 1917 Gilbert Vernam introduced the one-time pad cryptosystem, a secret key cryptosystem for telegraphic communication (D. Kahn, *The codebreakers: the story of secret writing*, Macmillan, New York, N.Y. (1967), 394–396). The one-time pad cryptosystem is provably secure from the information-theoretic point of view introduced by Claude Shannon (C. E. Shannon, *Communication theory of secrecy systems*, Bell Systems Technical Journal 28 (1949), 657–715) and later refined by Martin Hellman (M. E. Hellman, *An extension of Shannon's approach to cryptography*, IEEE Transaction on Information Theory v. IT-23 n.3 (1977), 289–294). The one-time pad system, according to Ronald Rivest, in his survey of contemporary cryptography, is rarely used because of the difficulty in generating, sharing, and storing very large keys (R. L. Rivest, *Cryptography*, p.721 in *Handbook of theoretical computer science volume A: Algorithms and complexity*, J. Van Lueewen, managing editor, MIT Press, Cambridge, Mass. (1994)). Rivest points out that one motivation for generating random pseudorandom sequences is for use in the one-time pad cryptosystem (ibid p. 735). According to Rivest (ibid p. 737) Manuel Blum and Silvio Micali introduced the first method for designing provably secure pseudorandom bit generators based on one-way predicates (M. Blum and S. Micali, *How to generate cryptographically strong sequences of pseudorandom bits*, SIAM Journal on Computing, vol. 13 no. 4 (1984). The term cryptographically secure in this setting is from the perspective of computational complexity. Rivest (ibid p. 738) also notes that a perfect pseudorandom bit generator exists if and only if there exists a one-way function F that cannot be easily inverted at points G(x) where G is the $t^{th}$ iterate of F applied to a k-bit string x. Rivest attributes this result to Leonid Levin (L. A. Levin, *One-way functions and pseudorandom number generators*, Combinatorica 7 (1987), 357–363).

According to Rivest (ibid p. 729), the notion of a public-key system was first published by Whitfield Diffie and Martin Hellman in 1976 (W. Diffie and M. E. Hellman, *New Directions in Cryptography*, IEEE Transactions on Information Theory IT-22 (1976), 644–654, also described in U.S. Pat. No. 4,200,700). Rivest observes that their general method makes use of trapdoor one-way permutations (ibid p. 729). Rivest also observes that the Diffie-Hellman method allows two parties to establish a shared secret key via a public discussion that anyone can overhear. Rivest himself, together with Adi Shamir and Leonard Adleman, introduced a system known today as the RSA public-key cryptosystem (R. Rivest, A. Shamir, and L. M. ADLEMAN, *A method for obtaining digital signatures and public-key cryptosystems*, Communications of the ACM 21 (1978), 120–126, also described in U.S. Pat. No. 4,405,829). The pioneering work on probabilistic public-key encryption was performed by Shafi Goldwasser and Silvio Micali (S. Goldwasser and S. Micali, *Probabilistic encryption*, Journal of Computer and System Sciences 26 (2) (1984), 270–299). Goldwasser and Micali employ the intractability of the quadratic residue problem in their constructions. The Diffie-Hellman, the RSA and the Goldwasser and Micali systems employ trapdoor one-way functions which have the deficiency that they require non-linear computations in extremely large finite rings.

The idea of a zeta one-way function was announced at the Special Session on Analytical Number Theory, Spring Meeting of the American Mathematical Society, Polytechnic University, Brooklyn, N.Y., Apr. 9, 1994 (M. Anshel and D. Goldfeld, *Zeta functions as one-way functions and cryptography*, A.M.S. Abstracts, Vol 15, no. 3 (April 1994), p. 349). Examples of such one-way functions are implicit in the earlier literature. For example, Kevin McCurley, in reference to sequences that are hard to predict (Kevin S. McCurley, *Odds and ends from cryptology and computational number theory*, in Cryptology and Computational Number Theory, C. Pomerance, Editor of the Proceedings of the Symposia in Applied Mathematics, Volume 42, A.M.S. Providence, R.I. (1990), p. 162) cites the work of Ivan Bjerre Damgård (I. V. Damgård, *On the randomness of Legendre and Jacobi sequences*, in Advances in Cryptology (Proceedings of Crypto '88), Lecture Notes in Computer Science, Springer-Verlag 403 Berlin (1990), 163–172). Damgård employs Legendre and Jacobi sequences to produce sequences which are difficult to predict. Leonard Adleman and Kevin McCurley draw on Legendre sequences to define and discuss the Quadratic Signature Problem in connection with the complexity of factoring and its relation to the extended Riemann hypothesis (Leonard M. Adleman and Kevin S. McCurley, *Open problems in number theoretic complexity II*, in Algorithmic Number Theory, Leonard M. Adleman and Ming-Deh Huang (Editors), Lecture Notes in Computer Science 877 Berlin (1994), 301–302). The current invention utilizes the unpredictability of certain Jacobi sequences and a generalization of the Quadratic Signature Problem to construct new trapdoor functions from zeta one-way functions for applications to private and public key cryptography.

SUMMARY OF THE INVENTION

It is a primary object of the present invention to provide a novel high speed cryptographically secure sequence generator (based on zeta one-way functions) for creating stream cipher code with predetermined probability distribution.

It is another primary objective of the present invention to provide a novel high speed code sequence generator (based on zeta one-way functions) for creating stream cipher code, with predetermined probability distribution, at higher security levels and concurrently at higher sequence rates than was heretofore possible.

It is another primary object of the present invention to construct new trapdoor one-way functions from cryptographically secure sequence generators (based on zeta one-way functions) for use in public key cryptography.

It is an object and feature of the present invention to provide an algebro-geometric combiner for creating high speed cryptographically secure sequences, with predetermined probability distribution, whose security is based on a zeta-one-way function associated to an algebraic variety specified by the predetermined probability distribution.

It is an object and feature of the present invention to provide a cryprographically secure authentication algorithm based on zeta-one-way functions associated to algebraic varieties.

It is an object and feature of the present invention that: (1) public authentication keys are generated with a stream cipher based on a zeta-one-way function, (2) the public authentication keys are themselves zeta one-way functions, and (3) a particular public authentication key is never used more than once in the implementation of the authentication algorithm.

It is an object and feature of the present invention to provide a cryprographically secure public key transfer based on zeta one-way functions.

It is an object and feature of the present invention to provide a cryprographically secure public-key cryptosystem based on zeta one-way functions.

It is a feature of the present invention that the problem of key management is minimized in the authentication algorithm. This is due to the fact that keys are only used once and then discarded.

It is a feature of the present invention that the public and private keys can be efficiently generated, shared and stored.

It is a feature of the present invention that the public-key cryptosystem provides dynamic encryption, i.e. a given bit will be encrypted in a totally different manner at each time.

It is a feature of the present invention to provide privacy enhanced communication by modest modification of the public key which results in modest modification of the key transfer process, and similarly results in modest modification of the encryption process in the public key cryptosystem.

It is a feature of the present invention that stream cipher code based on zeta-one-way functions can be generated by arithmetic operations in small finite fields, i.e., finite fields whose number of elements is at most polynomial in the logarithm of the analytic conductor of the associated zeta function.

This allows for easy implementation of the algorithms on low level computing devices with table driven modules.

To summarize, the present invention provides a high performance, high integrity, cryptographically secure sequence generator based on zeta one way functions for pseudorandom sequence generation, authentication, key transfer by public discussion, and public key encryption.

The system according to the invention is particularly suited towards implementation using currently available digital technology, commercially popular microprocessor based systems, and other affordable digital components. Significant portions of the system may be implemented and significant portions of the method according to the invention may be performed by software in a microcomputer based system or by hardware installed in such systems or other communication devices and combined with facsimile transmission components or communication terminals.

DETAILED DESCRIPTION OF THE PREFERRED EMBODIMENT

Figure 1:
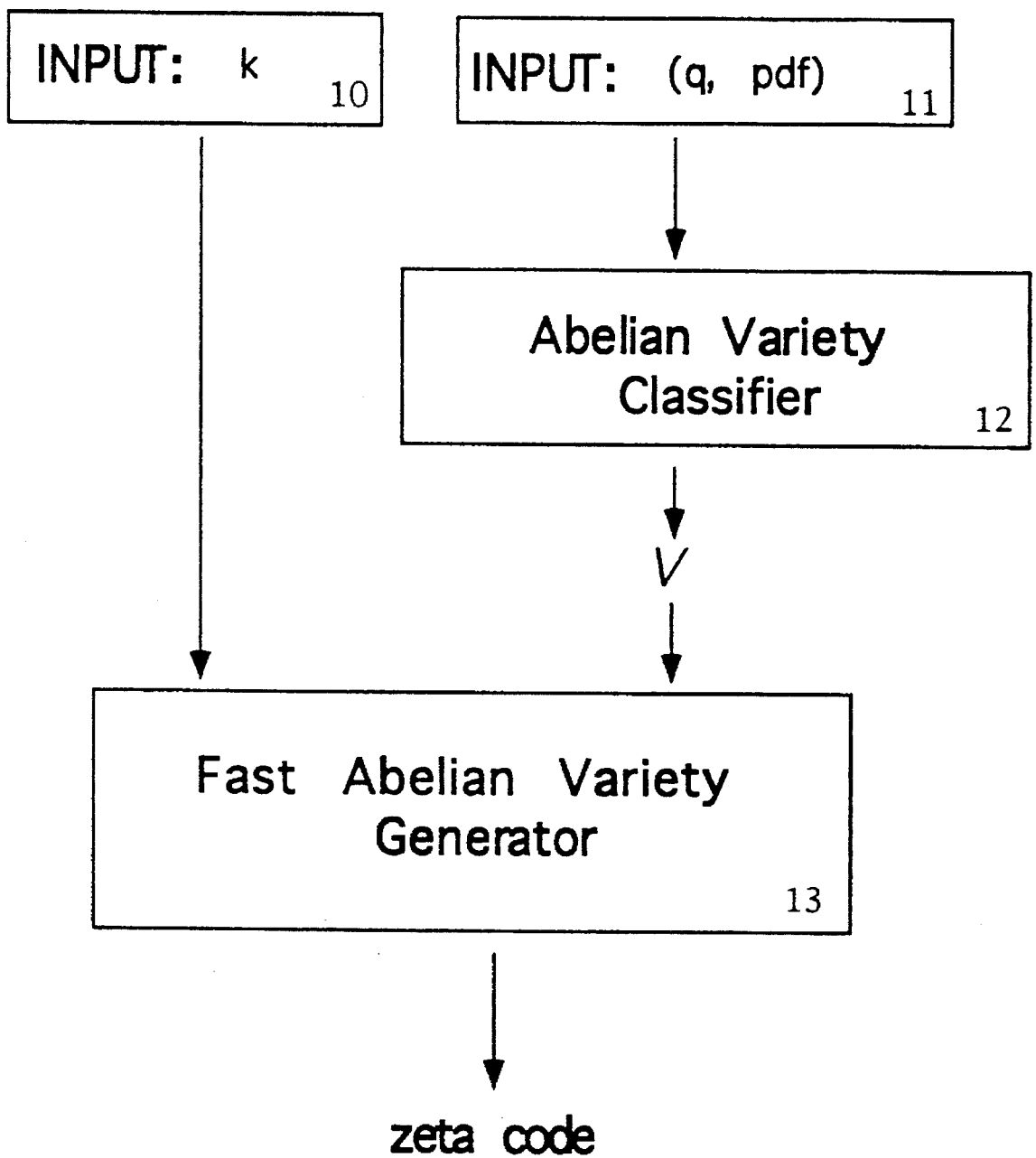
FIG. 1 shows a zeta function chooser.

Let $n \geq 0$ be an integer and define $$d_2(n) = \begin{cases} \lfloor \log_2 n \rfloor + 1, & \text{if } n > 0 \\ 1, & \text{if } n = 0. \end{cases}$$

where for an arbitrary real number $x \geq 0$, $\lfloor x \rfloor$ denotes the greatest integer less than or equal to x. We refer to $d_2(n)$ as the bit size of n. We extend this notion to non-negative integral vectors by defining the norm of $\|(n_1, n_2, \ldots, n_t)\|$ of a vector $(n_1, n_2, \ldots, n_t) \in \mathbb{N}^t$ as $$\|(n_1, n_2, \ldots, n_t)\| = \sum_{i=1}^{t} d_2(n_i).$$

Fix positive rational integers r, s. A function $f: \mathbb{N}^r \to \mathbb{N}^s$ is a one-way function provided the following three conditions hold.

(i) There exists an integer $k > 0$ such that $$\|\vec{n}\|^{\frac{1}{k}} \leq \|f(\vec{n})\| \leq \|\vec{n}\|^k$$

for $\vec{n} = (n_1, n_2, \ldots, n_r) \in \mathbb{N}^r$.

(ii) $f(\vec{n})$ can be feasibly computed in polynomial time in $\|\vec{n}\|$.

(iii) Given $\vec{m} \in \mathbb{N}^s$, there does not exist a feasible polynomial time algorithm which either computes a vector $\vec{n} \in \mathbb{N}^r$ such that $f(\vec{n}) = \vec{m}$ or indicates that no such value exists.

Condition (i) says that the bit size of $f(\vec{n})$ is neither polynomially longer or shorter than the bit size of $\vec{n}$. The term feasibly computed in polynomial time in condition (ii) and feasible polynomial time in condition (iii) means that the output may be created within the bounds of the technology employed and within the time bounds dictated by the purposes of the computation.

We now introduce a class of one-way functions based on the theory of zeta functions. In particular, we introduce the feasible polynomial time Selberg class $\mathcal{Z}$. The Selberg class was introduced in (A. Selberg, *Old and new conjectures and results about a class of Dirichlet series*, Collected Papers, Vol. 2, No. 44, Springer-Verlag (1991), 47–63), and we concretize the notion by introducing the concept of feasibility.

The feasible polynomial time Selberg class $\mathcal{Z}$ consists of zeta functions Z(s) which are given as Dirichlet series $$Z(s) = \sum_{n=1}^{\infty} \frac{a(n)}{n^s}, a(n) \in \mathbb{C}$$

(with complex coefficients a(n)) where it is assumed that the defining Dirichlet series Z(s) is absolutely convergent in some half-plane Re(s)$\gg$1. It is further assumed that Z(s) is a meromorphic function of a single complex variable s which satisfies the following hypotheses:

(iv) $a(n)=O(n^C)$ for some constant C>0 independent of n.

(v) $\log \mathcal{Z}(s) = \Sigma_n b(n) \cdot n^{-s}$, where b(n)=0 unless n=$p^r$, a positive prime power.

(vi) Given a prime power $p^r$, $\exists$ an algorithm to compute b($p^r$) in feasible polynomial time.

(vii) There exists A, k, $b_i$>0, w$\in \mathbb{C}$ with |w|=1, with a polynomial P(s) such that Z(s) satisfies a functional equation of type:

$$\Lambda(s) = A^s P(s) \left( \prod_i \Gamma(b_i s + d_i) \right) Z(s) = w \cdot \Lambda(k-s).$$

The constant A in the functional equation is called the analytic conductor of the zeta function. The Riemann hypothesis for any subfamily $\mathcal{Z}' \subset \mathcal{Z}$ is the statement that all zeros of $\Lambda(s)$ (corresponding to Z(s)$\in \mathcal{Z}'$) have Re(s)= k/2.

Definition: We say a subfamily of $\mathcal{Z}$ is bounded provided: (1) the conductor A in the functional equation (for any zeta function in the subfamily) lies in a fixed finite interval, (2) Abundance Property: For every $\epsilon$>0, the number of distinct zeta functions in the subfamily for which the conductor A lies in an interval of length B is greater than $B^{1-\epsilon}$ as B$\to\infty$.

Definition: Let $\mathcal{Z}^B \subset \mathcal{Z}$ be a bounded subclass. The class $\mathcal{Z}^B$ is said to be focused on (B, 2B) if for every zeta function in $\mathcal{Z}^B$ its conductor A$\in$(B, 2B).

We now restrict ourselves to the fixed subclass $\mathcal{Z}_{Hasse-Weil} \subset \mathcal{Z}$ of all zeta functions of Hasse-Weil type (see, D. Husemoller, *Elliptic Curves*, Graduate Texts in Mathematics 111, Springer-Verlag, New York (1987), 291–293). Fix a large integer B. We now explicitly describe the one-way function based on a fixed bounded subclass $$\mathcal{Z}_{Hasse-Weil}^B \subset \mathcal{Z}_{Hasse-Weil}.$$

In order to simplify the exposition, we assume that the algebraic variety associated to $\mathcal{Z}_{Hasse-Weil}$ is defined over $\mathbb{Q}$. In this case the coefficients in the Dirichlet expansion of all zeta functions in $\mathcal{Z}_{Hasse-Weil}$ are rational integers. It is known (Dorian Goldfold, Jeffrey Hoffstein, *On the number of Fourier coefficients that determine a modular form*, in Contemporary Math. 143, A Tribute to Emil Grosswald: Number Theory and Related Analysis, Amer. Math. Soc. (1993), 385–393) that the Riemann hypothesis for a zeta function in $\mathcal{Z}_{Hasse-Weil}$ implies that the zeta function is uniquely determined by its initial b=(log B)$^{2+\epsilon}$ Dirichlet coefficients. Let $D_{Hasse-Weil}$ denote the set of all vectors consisting of the first b coefficients of any zeta function in $\mathcal{Z}_{Hasse-Weil}$. Then $$D_{Hasse-Weil} \subset \mathbb{N}^b.$$

The zeta functions in $\mathcal{Z}_{Hasse-Weil}$ can be ordered by vectors of non-negative integers determined by the polynomial equations defining the variety associated to the zeta function in $\mathcal{Z}_{Hasse-Weil}$. Our one-way function is the function f where $$f: \mathcal{Z}_{Hasse-Weil} \to D_{Hasse-Weil}$$

is the function that associates to any zeta function in $\mathcal{Z}_{Hasse-Weil}$ the vector of its initial b Dirichlet coefficients.

The Hasse-Weil zeta one-way functions are a special case of the more general Jacquet-Langlands zeta one-way functions which we now briefly describe. The Jacquet-Langlands class of zeta functions, denoted $\mathcal{Z}_{J-L} \in \mathcal{Z}$, consists of zeta functions associated to cuspidal automorphic forms on reductive groups (see Stephen S. Gelbart, Automorphic Forms on Adele Groups, Annals of Mathematics Studies 83 Princeton University Press and University of Tokyo Press, Princeton, N.J. (1975), 108–121). Similarly as above, it is possible to define a zeta one-way function for this class.

We now describe the zeta pseudorandom number generator associated with a positive integer q. Consider the list $$\{0, 1, 2, \ldots, q-1\}$$

of the first q non-negative integers. We view these as symbols. A pseudorandom number generator based on q with uniform probability distribution function pdf is a feasible polynomial time algorithm whose outputs are sequences $$a_1, a_2, a_3, a_4, a_5, \ldots$$

with $a_i \in \{0, 1, 2, \ldots, q-1\}$ for i=1, 2, 3, $\ldots$, with uniform probability distribution function pdf. This simply means that the probability of the symbol j$\in\{0, 1, 2, \ldots, q-1\}$ occurring is pdf(j) and the probability of any finite sequence $\{j_1, j_2, \ldots j_s\}$ occurring is $$\prod_{i=1}^{s} pdf(j_i).$$

The zeta pseudorandom number generator based on q will now be described. For simplicity we restrict ourselves to the class, $\mathcal{Z}_{Hasse-Weil}$, of Hasse-Weil zeta functions defined over the rational numbers $\mathbb{Q}$. Let $$\zeta(s) = \sum_{n=1}^{\infty} a(n) \cdot n^{-s}$$

be in $\mathcal{Z}_{Hasse-Weil}$. Define $a_q(n)$ by the congruence $$a_q(n) \equiv a(n) \pmod{q},$$

where $a_q(n) \in \{0, 1, 2, q-1\}$. The zeta pseudorandom number generator based on q and Hasse-Weil zeta function $\zeta(s)$ simply outputs the sequence $$a_q(2), a_q(3), a_q(7), a_q(11), a_q(13), a_q(17),$$

running over the list of the precomputed positive integral primes. To construct a zeta pseudorandom number generator based on q with a given uniform probability distribution pdf, it is necessary to carefully choose the particular Hasse-Weil zeta function. $\zeta(s)$, or equivalently, the algebraic variety which defines it. The choice of the variety will be determined by Serre's theory of abelian q-adic representations (Jean-Pierre Serre, Abelian l-adic Representations and Elliptic Curves, W. A. Benjamin Inc. New York (1968), 21–26). The new zeta function $$\zeta_q(s) = \sum_{n=1}^{\infty} a_q(n) \cdot n^{-s}$$

will be in the Jacquet-Langlands class. This means that if we consider the finite sequence $$\mathcal{L} = \{a_q(2), a_q(3), a_q(5), a_q(7), a_q(11), a_q(13), \ldots, a_q(q)\}$$

with some prime q not larger than $(\log A)^{2+\epsilon}$, where A denotes the conductor of $\zeta_q(s)$, then it will not be feasible to reconstruct $\zeta_q(s)$ from the list $\mathcal{L}$ in polynomial time in the number of digits of A. This is equivalent to the fact that $\zeta_q(s)$ determines a zeta-one-way function.

The Zeta Pseudorandom Number Generator ZPNG:

First, we describe the Zeta Function Chooser 20, which accepts as inputs: k 10, and a pair (q, pdf) 11 consisting of a positive integer $q \geq 2$ and a rational probability distribution pdf on q symbols. The input 11 goes to the Abelian Variety Classifier 12 which chooses a class of abelian varieties V. The input k 10, together with the output V of 12 is presented to the Fast Abelian Variety Generator 13 which generates a particular abelian variety $v \in V$ and outputs the zeta code associated to v. This completes the description of the Zeta Function Chooser 20 encapsulated in FIG. 1.

Next we describe the Zeta Coefficient Generator, ZCG 30. ZCG 30, accepts as inputs, an input password k 10, a pair (q,pdf) 11 consisting of a positive integer $q \geq 2$ and a rational probability distribution function pdf on q symbols, and a monotone increasing sequence 22 of s positive prime integers $(p_1, p_2, \ldots, p_s)$. Inputs 10 and 11 are presented to the Zeta Function Chooser 20 which outputs the zeta code for producing a zeta function $$\zeta(s) = \sum_{n=1}^{\infty} a(n) \cdot n^{-s}.$$

When the zeta code and the input 22 are presented to the Zeta Function Coefficient Producer 21, then 21 computes the sequence of zeta coefficients $$a(p_1), a(p_2), \ldots, a(p_s).$$

This data is then stored in the Zeta Coefficient Store and Forward Module 23. This completes the description of the Zeta Coefficient Generator 30 encapsulated in FIG. 2.

Figure 3:
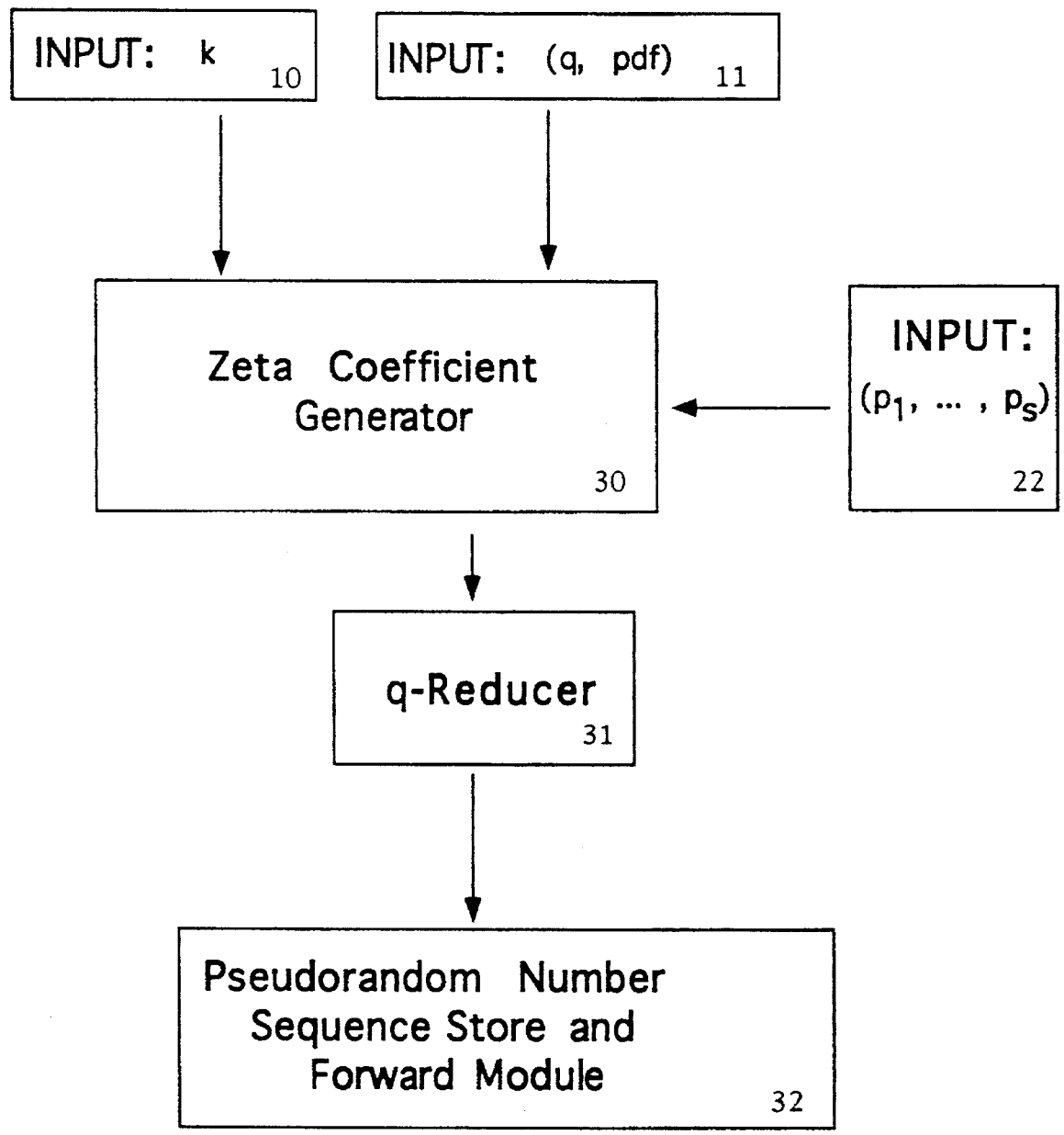
FIG. 3 shows a zeta pseudorandom number generator.
Figure 4:
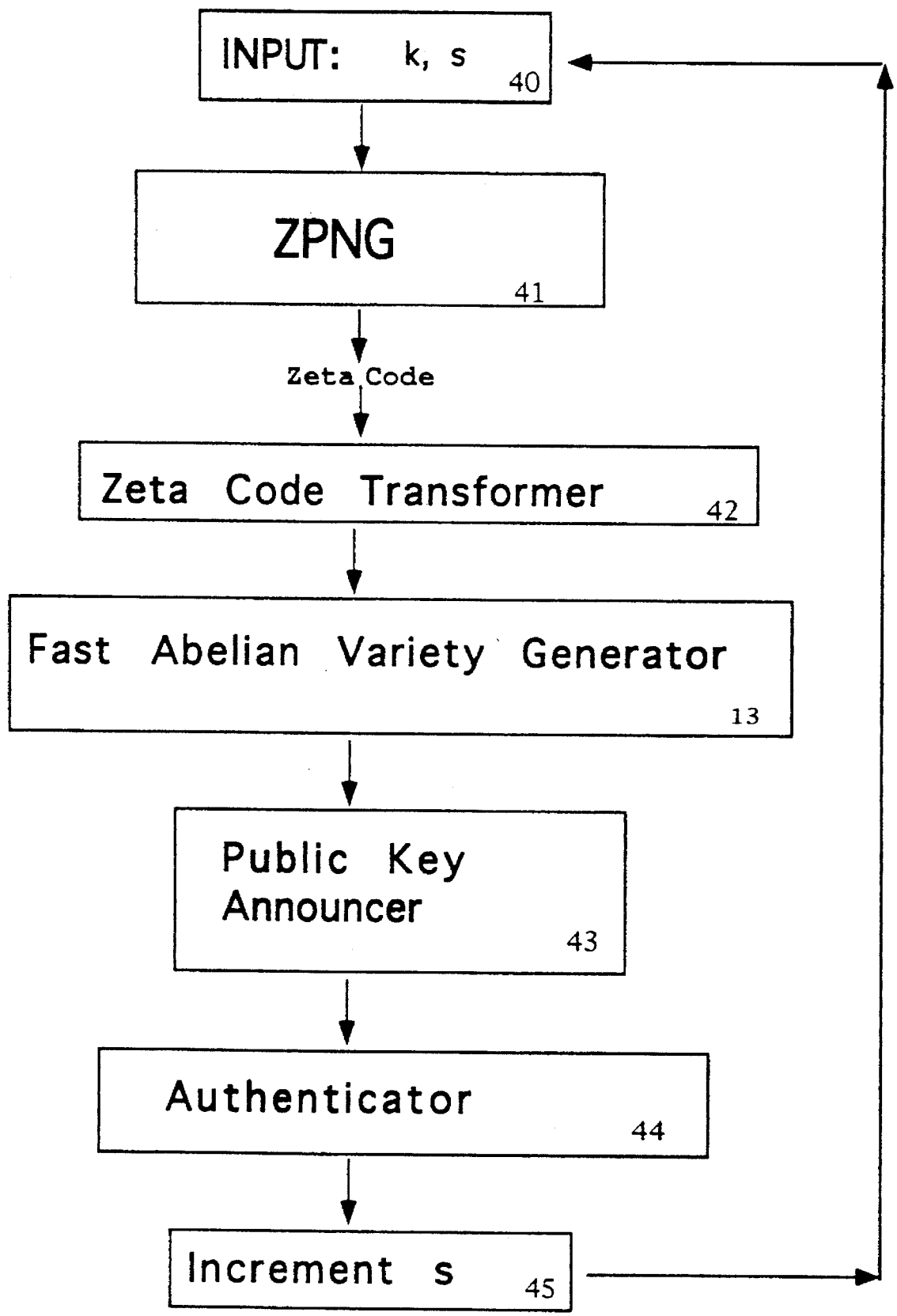
FIG. 4 shows a zeta function authenticator.

We now proceed to describe the Zeta Pseudorandom Number Generator ZPNG given in FIG. 3. Inputs 10, 11, and 22 are presented to ZCG 30, resulting in a sequence of zeta coefficient zcs, $$a(p_1), a(p_2), \ldots, a(p_s)$$

stored in 23. The data, zcs, is then forwarded to the q-Reducer 31 which computes the new sequence zcsq $$a(p_1), a(p_2), \ldots, a(p_s) \pmod{q},$$

which is forwarded to the Pseudorandom Number Sequence Store and Forward Module 32. The final output zcsq will be a pseudorandom sequence on the q symbols $\{0, 1, 2, \ldots, q-1\}$ with probability distribution pdf. This completes the description of the Zeta Pseudorandom Number Generator ZPNG.

Authentication by Public Discussion:

We now describe a very simple and highly secure authentication algorithm. Consider a network of users. Every user has a fixed private key k(0). We let $s=1, 2, 3, \ldots$ denote the state of the user. Initially, s=1. At every state $s=1, 2, 3, \ldots$ the user has a private key v(s) (which is an abelian variety) and a public key k(s) (the initial zeta coefficients of the Hasse-Weil zeta function associated to v(s)). The public key k(s) is announced to all the other users. These keys are computed as follows. Upon receiving the inputs k(0), s, 40, the Zeta Pseudorandom Number Generator ZPNG 41 outputs zeta code which is transformed by the Zeta Code Transformer 42 and converted to suitable input for the Fast Abelian Variety Generator 13 which generates the abelian variety v(s) and computes the zeta code k(s) associated to v(s). This information is sent to the Public Key Announcer 43 which announces the public key k(s) for the state s. The public and private keys k(s), v(s) are then sent to the Authenticator 44 which publicly announces v(s) if authentication is required. At this point, the state s is incremented by one, i.e., s=s+1 45 and the entire process repeats. Every public key v(s) is used only once and then discarded. It is never used again.

Example

We give a simple example of our Zeta Pseudorandom Number Generator ZPNG 41 where the class of abelian varieties is pre-chosen to be the class of elliptic curves and the input 11 is pre-chosen such that q=2 and the probability distribution pdf is the probability distribution on 2 symbols (0, 1) determined by pdf(0)=⅓ and pdf(1)=⅔.

Figure 5:
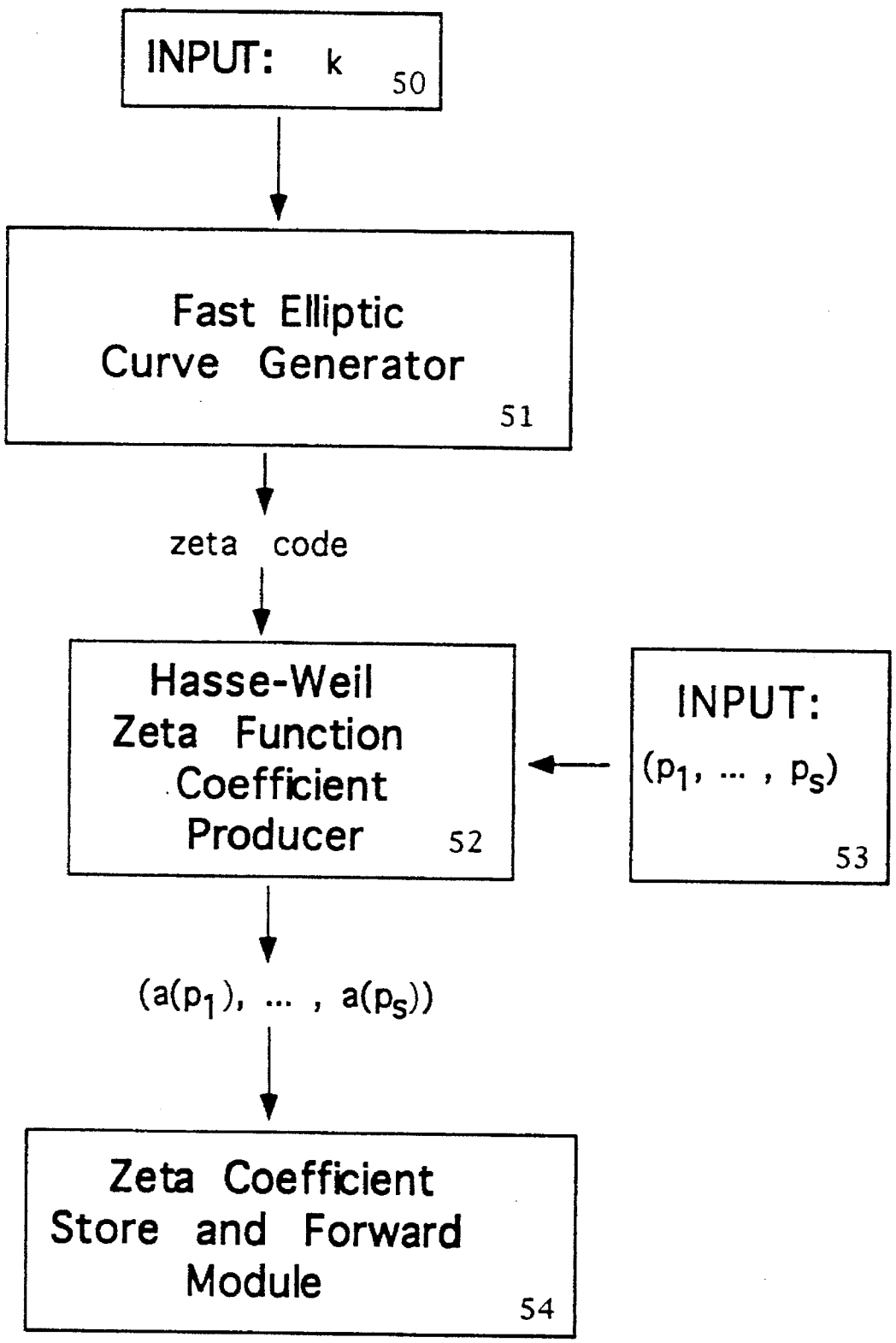
FIG. 5 shows a Hasse-Weil pseudorandom number generator.
Figure 6:
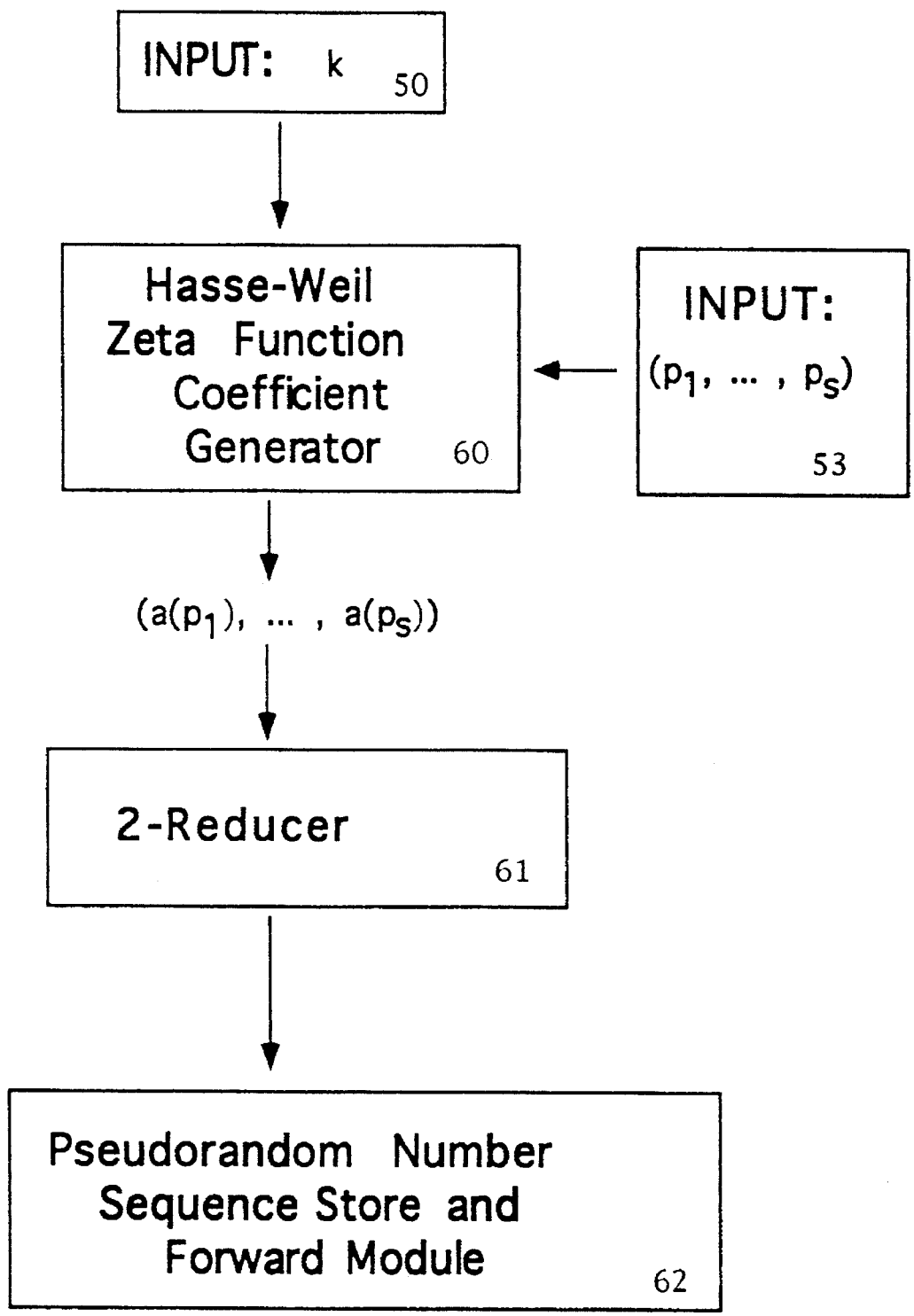
FIG. 6 shows a specific Hasse-Weil pseudorandom number generator.

We first describe the Hasse-Weil Zeta Function Coefficient Generator 52 in FIG. 5. The input is a positive rational integer k, 50 which uniquely determines a pair of integers a, b satisfying $b^3 - 27a^2 \neq 0$. To provide additional security to the overall system the pair of integers (a, b) may be produced from the input k, 50, by employing a one-way function. The Fast Elliptic Curve Generator 51 generates the elliptic curve $$E: y^2 = x^3 - a\, x - b.$$

Figure 2:
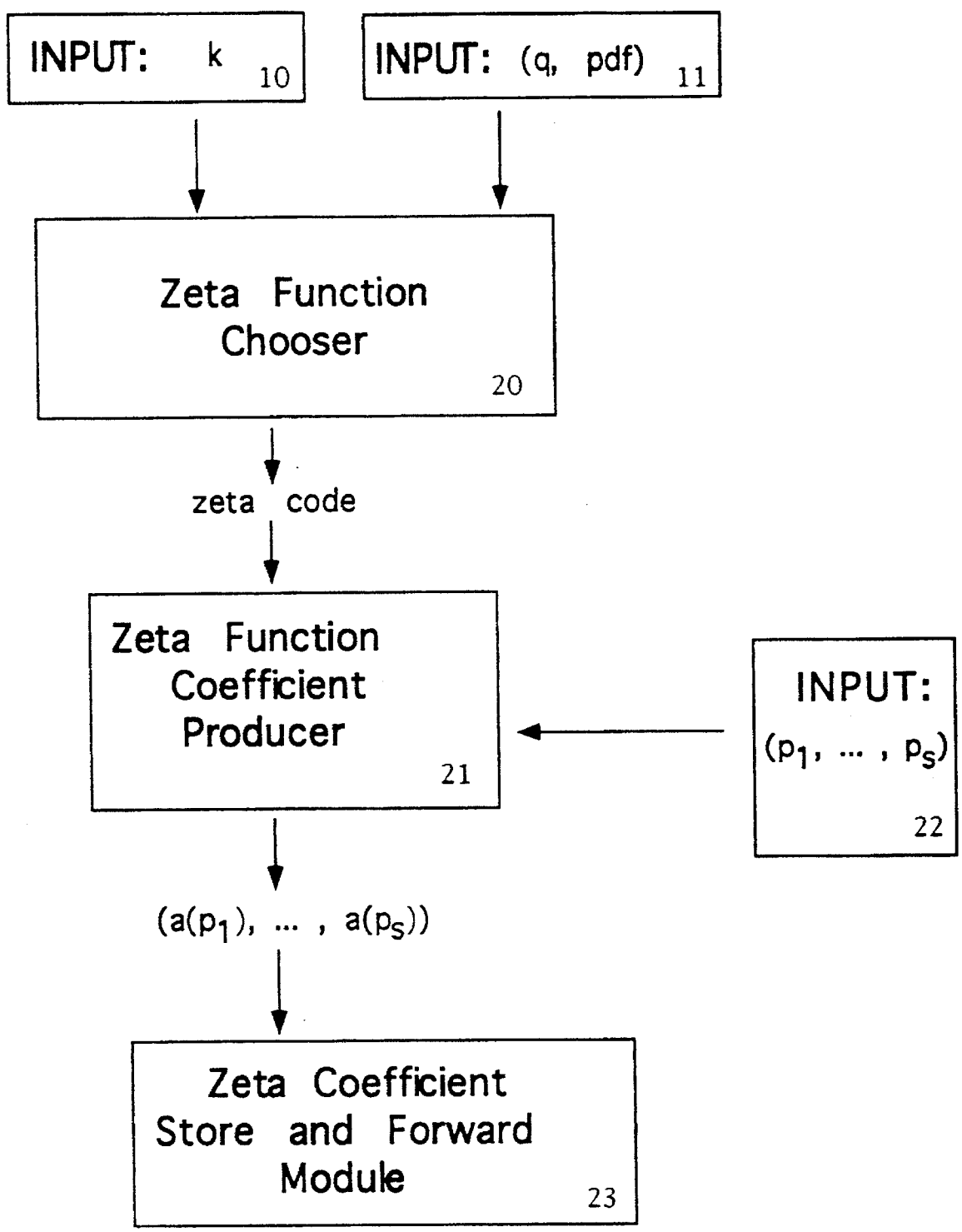
FIG. 2 shows a zeta coefficient generator.

The Hasse-Weil Zeta Function Coefficient Producer 52 has 2 inputs: the elliptic curve E outputted by 51 (which in the general case is referred to as the zeta code in FIG. 2), and the input $(p_1, \ldots, p_s)$, 53. The Hasse-Weil Zeta Function Coefficient Producer 52 (see, D. Husemoller, Elliptic Curves, Graduate Texts in Mathematics 111, Springer-Verlag, New York (1987), 291–293) then outputs the coefficients $$a(p_1), \ldots, a(p_s)$$

of the Hasse-Weil Zeta Function $$\sum_{n=1}^{\infty} a(n) \cdot n^{-s}$$

associated to E to the Zeta Coefficient Store and Forward Module 54. This completes the description of the Hasse-Weil Zeta Function Coefficient Generator 51 in FIG. 5.

We now give a description of the algorithm for our example. The inputs k, 50 and $(p_1, \ldots, P_s)$, 53 are sent to the Hasse-Weil Zeta Function Coefficient Generator 60 which ouputs the zeta coefficients $a(p_1), \ldots, a(p_s)$. These are sent to the 2-Reducer 61 which reduces each of these coefficients (mod 2)

$$a(p_1), \ldots, a(p_s) \pmod{2}.$$

The result will be the required binary pseudorandom number sequence which is then sent to the Pseudorandom Number Sequence Store and Forward Module 62.

Key Transfer by Public Discussion:

We now describe an algorithm for key transfer by public discussion whose security is based on a zeta one-way function. It is a feature of this algorithm that neither party will have knowledge of the key k prior to the transfer. Since it is enough to transfer one bit at a time we shall assume that $k \in \{+1,-1\}$.

The algorithm can be developed in rather large generality. For example, if $$Z(s) = \sum_{n=1}^{\infty} \alpha(n) n^{-s}$$

is in the feasible polynomial time Selberg class and there exists an integer $f$, a function $b(x, y)$ on pairs of integers $x$, $y$, and a set A of integers such that $$a(n) = b(n, f) \quad (1)$$

$$b(n, f) = b(f, n) \text{ if } n, f \in A, \quad (2)$$

then the key transfer algorithm can be developed. A very general class of zeta functions which satisfy (1) and (2) is the class of Artin L-functions (see H. Heilbronn, *Zeta-functions and L-functions*, in Algebraic Number Theory, Proceedings of an Instructional Conference organized by the London Mathematical Society, (Edited by J. W. S. Cassels and A. Fröhlich), Thompson Book Company Inc., Washington D.C. (1967), 218–225) and condition (2) above is a consequence of the Artin reciprocity law.

In order to simplify the exposition, we focus on the special example of Dirichlet L-functions with real quadratic characters $\chi$ (mod $f$) where $$\chi(n) = \left(\frac{n}{f}\right)$$

is the Jacobi symbol (see Harold Davenport, Multiplicative Number Theory, Second Edition, revised by H. L. Montgomery, Graduate Texts in Mathematics 74, Springer-Verlag, New York (1980), 38–40) of conductor $f$. Let $$L(s, \chi) = \sum_{n=1}^{\infty} \chi(n) n^{-s}$$

denote the Dirichlet L-function associated to $\chi$.

Fix a large integer X and divide the set of primes congruent to one modulo four (which are less than X) into two classes P, P' where $$P = \{\text{primes } p \leq X | p \equiv 1 \pmod{8}\}$$

$$P' = \{\text{primes } p \leq X | p \equiv 5 \pmod{8}\}.$$

Figure 7:
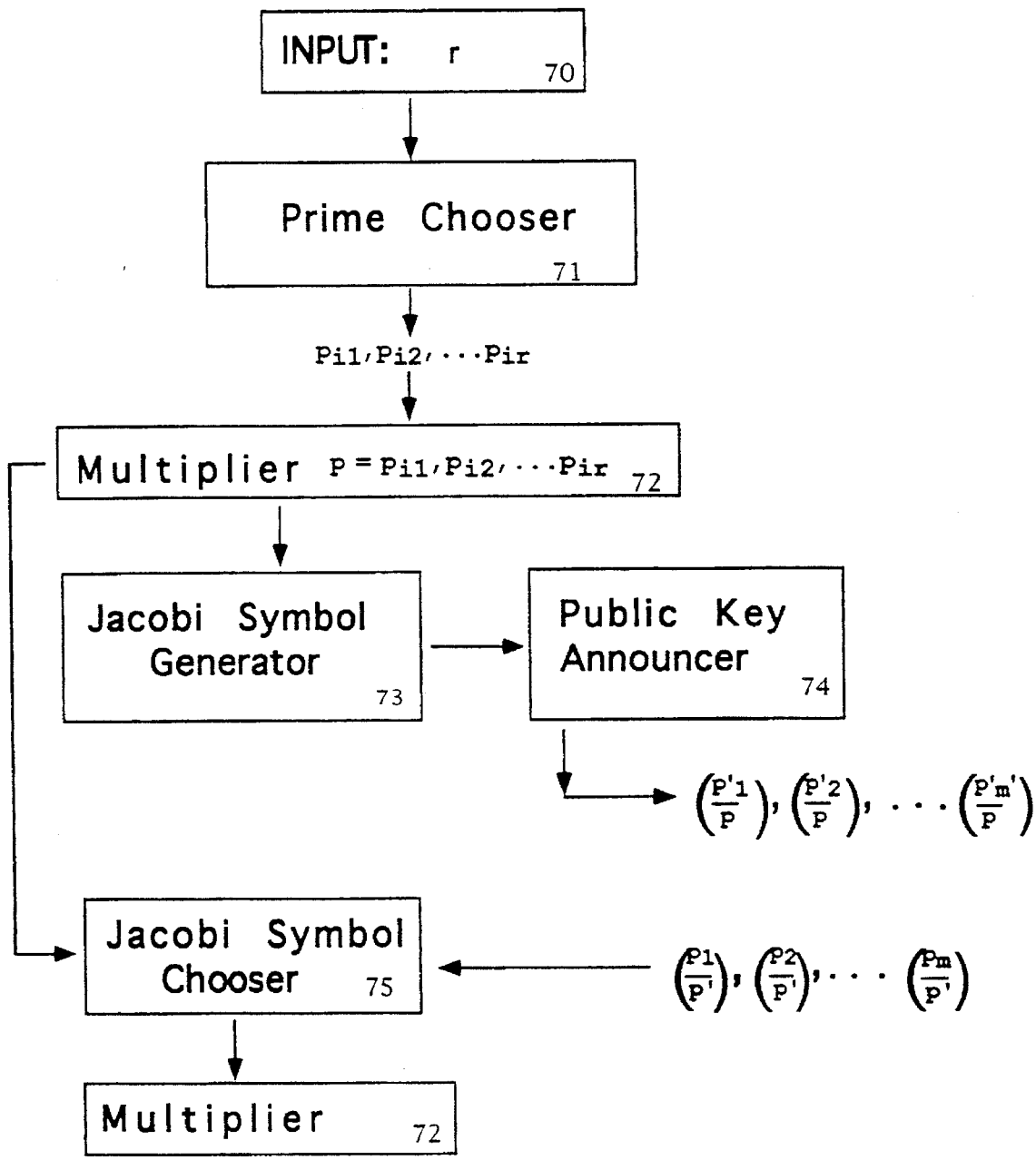
FIG. 7 shows a public key transfer system.

Let m denote the cardinality of the set P, and let m' denote the cardinality of the set P'. We preassign P to the first party engaging in the key exchange, and we preassign P' to the second party. Since the key transfer protocol is entirely symmetric, it is enough to restrict our discussion to the first party. We italicize the symmetric operations for the second party. We now describe the key transfer algorithm encapsulated in FIG. 7.

Upon receiving the input 70 of a positive integer r, the Prime Chooser 71 randomly chooses r primes $p_{i_1}, p_{i_2}, p_{i_3}, \ldots p_{i_r}$ in the set P. (the second party chooses r' primes $p'_{i_1}, p'_{i_2}, \ldots, p'_{i_{r'}}$ in P'). These are sent to the Multiplier 72 which simply computes the product $p = p_{i_1} \cdot p_{i_2} \cdots p_{i_r}$ (the second party computes $p' = p'_{i_1} \cdot p'_{i_2} \cdots p'_{i_{r'}}$) and then sends p to the Jacobi Symbol Generator 73 and the Jacobi Symbol Chooser 75. The Jacobi Symbol Generator 73 computes the vector $$\left\{ \left(\frac{p'_1}{p}\right), \left(\frac{p'_2}{p}\right), \ldots, \left(\frac{p'_{m'}}{p}\right) \right\}$$

where $$p'_1 = 5, p'_2 = 13, p'_3 = 29$$

are the primes in P' written in ascending order. The Jacobi Symbol Generator sends the vector of Jacobi symbols to the Public Key Announcer 74. The Public Key Announcer 74 publicly announces the vector $$\left\{ \left(\frac{p'_1}{p}\right), \left(\frac{p'_2}{p}\right), \ldots, \left(\frac{p'_{m'}}{p}\right) \right\}.$$

The public Announcer for the second party will announce the vector $$\left\{ \left(\frac{p_1}{p'}\right), \left(\frac{p_2}{p'}\right), \ldots, \left(\frac{p_m}{p'}\right) \right\}$$

where $$p_1 = 17, p_2 = 41, p_3 = 73 \ldots$$

are the primes in P written in ascending order. When this data is presented to the Jacobi Symbol Chooser 75, the Jacobi Symbol Chooser chooses the vector of Jacobi symbols $$\left\{ \left(\frac{p_{i_1}}{p'}\right), \left(\frac{p_{i_2}}{p'}\right), \ldots, \left(\frac{p_{i_m}}{p'}\right) \right\}$$

and this data is sent to the Multiplier 72 which multiplies these Jacobi symbols to produce the key k given by $$k = \left(\frac{p_{i_1}}{p'}\right) \cdot \left(\frac{p_{i_2}}{p'}\right) \cdots \left(\frac{p_{i_m}}{p'}\right).$$

It is a consequence of the law of quadratic reciprocity that both parties will obtain the same key by this process.

Public Key Encryption Scheme:

Fix a large integer X and divide the set of primes congruent to one modulo four (which are less than X) into two classes P, P' where $$P = \{\text{primes } p \leq X | p \equiv 1 \pmod{8}\}$$

$$P' = \{\text{primes } p \leq X | p \equiv 5 \pmod{8}\}.$$

Let m denote the cardinality of the set P, and let m' denote the cardinality of the set P'. We preassign the set P to the person holding the public encryption key (we shall call this person A) and we preassign the set P' to anyone (called B) who wishes to communicate with A. Let A have input r 70 and let B have input r' 70. It is required that the input r 70 be an odd integer. The public encryption key is simply the output of the Public Key Announcer 74 in FIG. 7.

Figure 8:
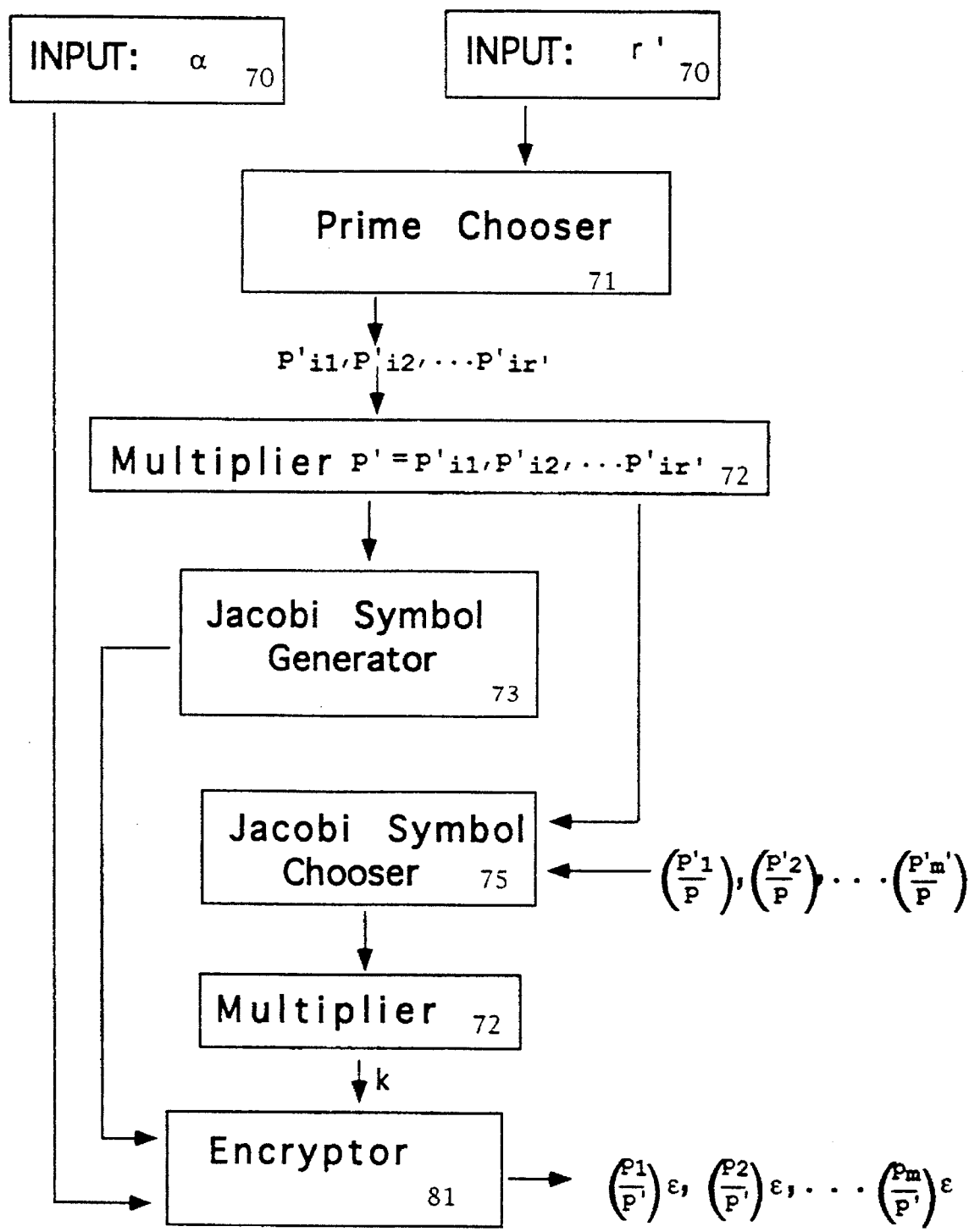
FIG. 8 shows a public key encryption system.

We now describe the encryption algorithm (encapsulated in FIG. 8) which allows B to encrypt a single bit a which we may assume to be either +1 or −1. Clearly, a long message can be encrypted bit by bit by iterating the procedure. The input a is sent to the Encryptor 81. When the input r' 80 is presented to the Prime Chooser 71 in FIG. 8, r' primes $p'_{i_1}, p'_{i_2}, \ldots, p'_{i_{r'}}$ are randomly chosen from the set P'. These are then transferred to the Multiplier 72 which computes the product $$p' = p'_{i_1} \cdot p'_{i_2} \cdots p'_{i_{r'}}.$$

Upon receiving the input p', the Jacobi Symbol Generator 73 generates the list of Jacobi symbols $$\left(\frac{p_1}{p'}\right), \left(\frac{p_2}{p'}\right), \ldots, \left(\frac{p_m}{p'}\right).$$

This list is then sent to the Encryptor 81. The Jacobi Symbol Chooser 75, upon receiving the public encryption key $$\left(\frac{p'_1}{p}\right), \left(\frac{p'_2}{p}\right), \ldots, \left(\frac{p'_m}{p}\right),$$

then chooses the appropriate subset of these Jacobi symbols, i.e. the symbols $$\left(\frac{p'_{i_1}}{p}\right), \left(\frac{p'_{i_2}}{p}\right), \ldots, \left(\frac{p'_{i_r}}{p}\right),$$

and sends these symbols to the Multiplier 72. The Multiplier 72 then multiplies these symbols and transfers the product k to the Encryptor 81. The Encryptor 81 then produces the list of plus and minus ones given by $$\left(\frac{p_1}{p'}\right)\epsilon, \left(\frac{p_2}{p'}\right)\epsilon, \ldots, \left(\frac{p_m}{p'}\right)\epsilon,$$

where $\epsilon = \alpha \cdot k$. This is the encrypted bit. The reason for multiplying every element of the list by $\epsilon$ is to insure that the key transfer mechanism used by A in decryption will yield $\alpha$. The fact that r is odd guarantees the success of the method. Since the Prime Chooser 71 generates a random list of primes, it cannot be guaranteed in advance what the key transfer will be.

Since the public encryption scheme is so closely related to the public key transfer previously discussed it is clear that the method will work in much greater generality than has been presented here. For example, such a scheme can be developed in the framework of an algebraic number field and the use of Artin symbols instead of Jacobi symbols. Note that a Jacobi symbol is a special case of an Artin symbol. The cryptographic security of the system will then be based on the zeta one-way function associated to the class of Artin L-functions.

Figure 9:
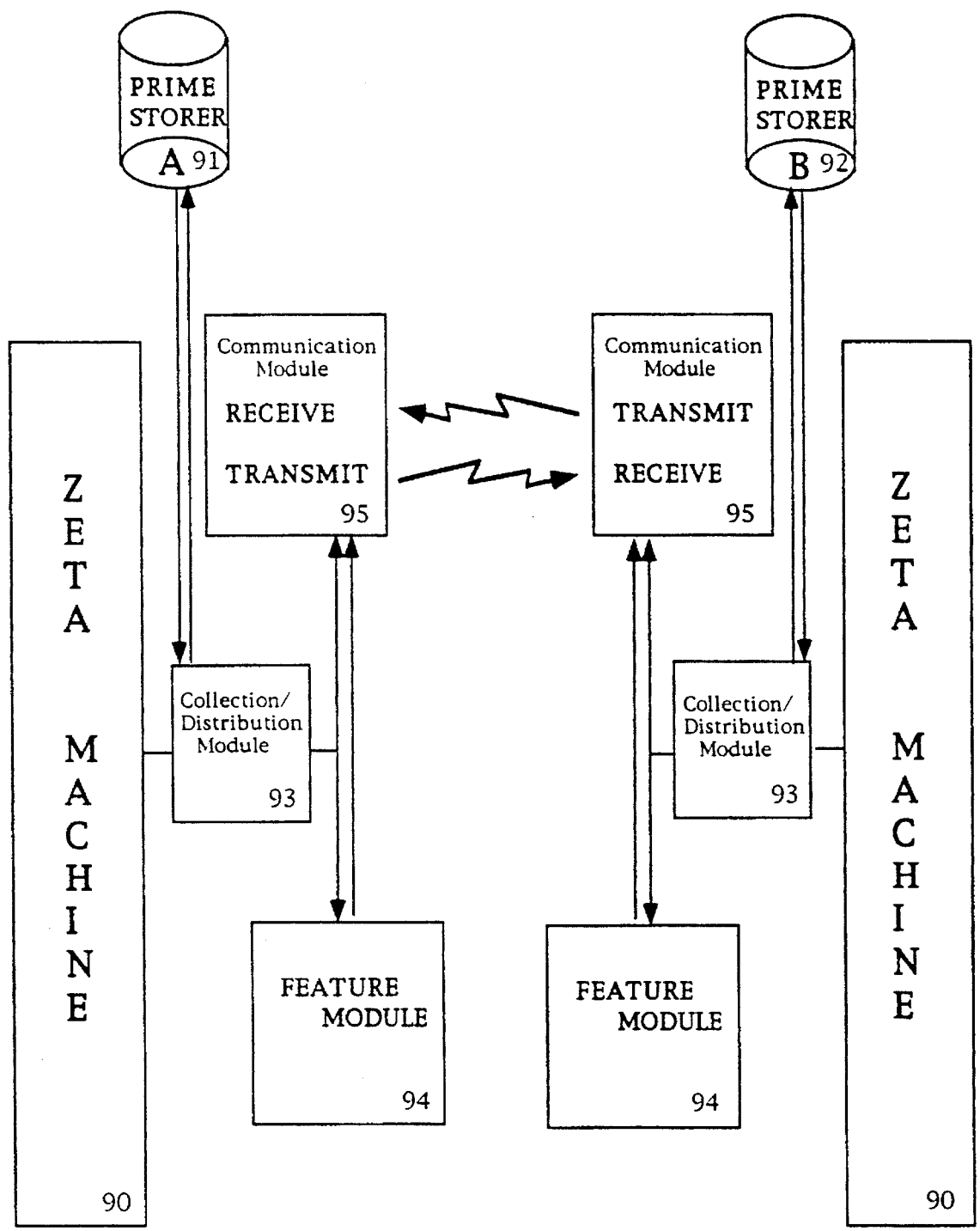
FIG. 9 shows a zeta communication system with two stations.

Zeta Apparatus:

The Zeta Apparatus is illustrated in FIG. 9. It includes identical subsystems, A and B, which communicate through Communication Modules 95 (which receive and transmit code) and which also communicate with off-line Prime Storers 91, 92. Prime Storers 91, 92 store and produce disjoint sets of primes (determined by Artin reciprocity) from a predetermined algebraic number field. For example, in the special case where the algebraic number field is the rational number field, we may take the set of primes stored in 91 to be the primes congruent to 1 modulo 8, and the set of primes stored in 92, the primes congruent to 5 modulo 8. The main components of the Zeta Apparatus are: identical Zeta Machines 90 which perform arithmetic computations; the Communication Modules 95 for information exchange between subsystems A, B; Collection/Distribution Modules 93 for internally storing and routing data within a subsystem; Feature Modules 94 for specifying required modes of operation. The Zeta Apparatus operates in the following modes: Pseudorandom Sequence Generator Mode; Authentication Mode; Key Transfer Mode; Send/Receive Mode; Privacy Enhancer Mode (this mode operates in conjunction with the latter three modes).

The most basic operating mode of the Zeta Apparatus is as a pseudorandom sequence generator. This mode of operation is readily employed in the operation of stream ciphers, and is utilized in the other modes of operation of the Zeta Apparatus. The higher modes of operation refer to authentication, key exchange by public discussion and message transfer employing public key encryption. These higher modes of operation can be enhanced by a unique feature employed in the Zeta Apparatus allowing users of the Zeta Apparatus to employ private keys for enhanced security.

Figure 10:
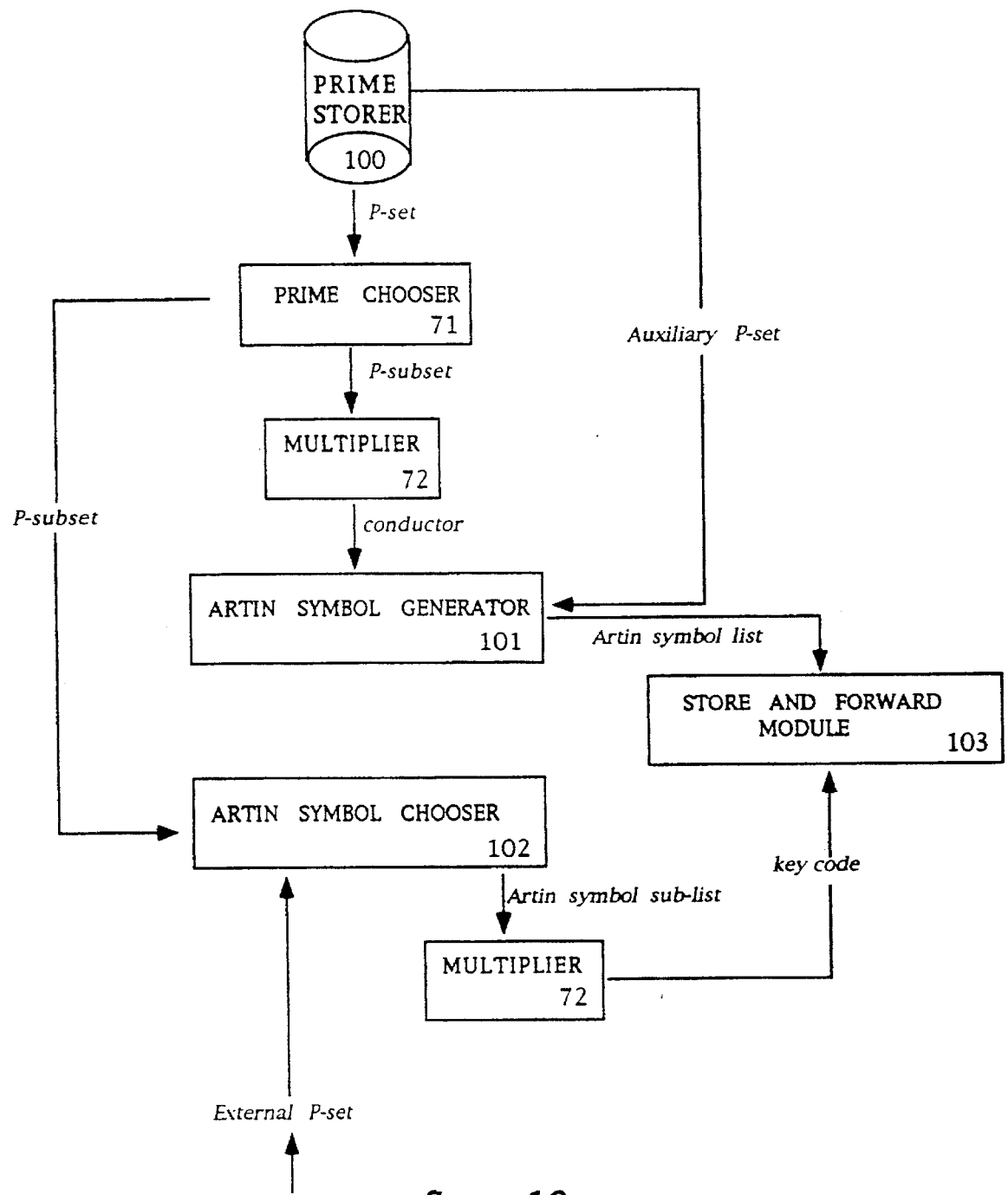
FIG. 10 shows a schematic diagram of the basic zeta function machine.

We now discuss FIG. 10 which represents the Zeta Machine 90 occurring in subsystems A, B. The Zeta Machine operates in the following manner. The Prime Chooser 71 requests a set of primes (denoted P-set) from the Prime Storer 100. After receiving P-set, Prime Chooser 71 chooses a subset of P-set (denoted P-subset) and sends P-subset to both the Multiplier 72 and the Artin Symbol Chooser 102. The Multiplier 72 produces from P-subset the conductor which is the product of the primes in P-subset. The conductor is sent to the Artin Symbol Generator 101 which then requests an additional set of primes (denoted Auxiliary P-set) from the Prime Storer 100 and then computes from the conductor and Auxiliary P-set the Artin symbol list which is then sent to the Store and Forward Module 103. Alternatively, the primes of the P-set and or the Auxiliary P-set may be generated or calculated according to predetermined criteria or retrieved over a communication channel. The Artin Symbol Chooser 102, upon receiving P-subset from Prime Chooser 71 and an External P-set, produces Artin symbol sub-list which is then sent to the Multiplier 72 which simply multiplies the Artin symbols in the Artin symbol sub-list producing the keycode which is sent to the Store and Forward Module 103.

Figure 11:
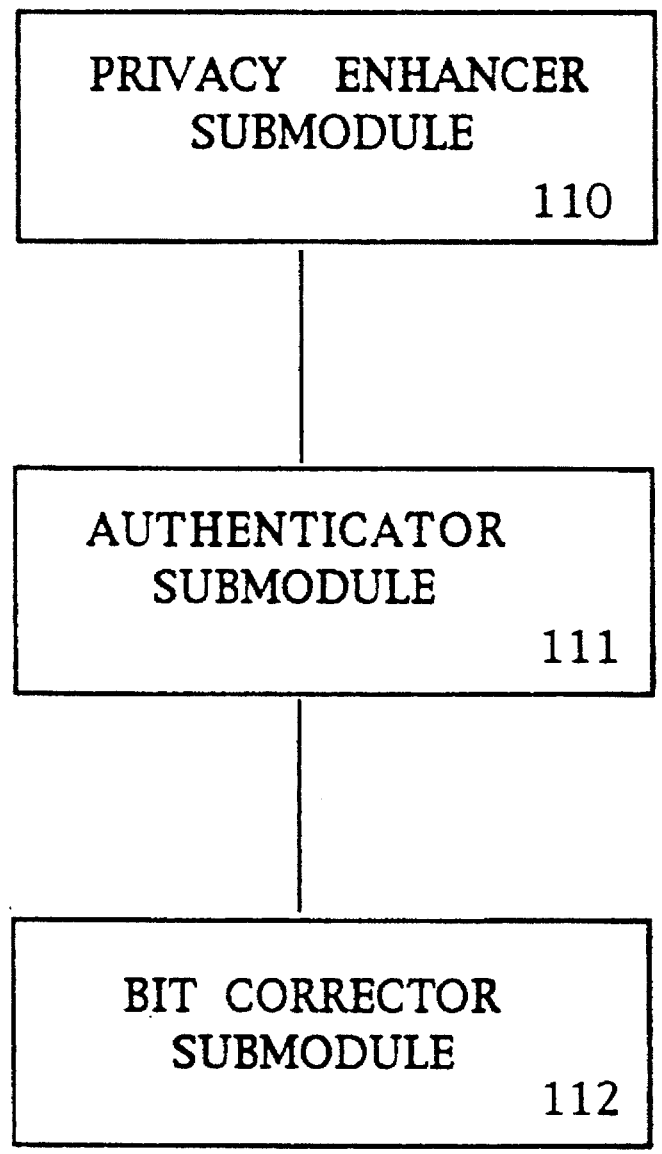
FIG. 11 shows a zeta apparatus in pseudorandom sequence generator mode.

FIG. 11 represents the Feature Module 94 which includes three submodules: Privacy Enhancer Submodule 110; Authenticator Submodule 111; Bit Corrector Submodule 112. The Feature Module 94 configures its submodules 110, 111, 112 according to the specified mode of operation of the Zeta Apparatus.

Figure 12:
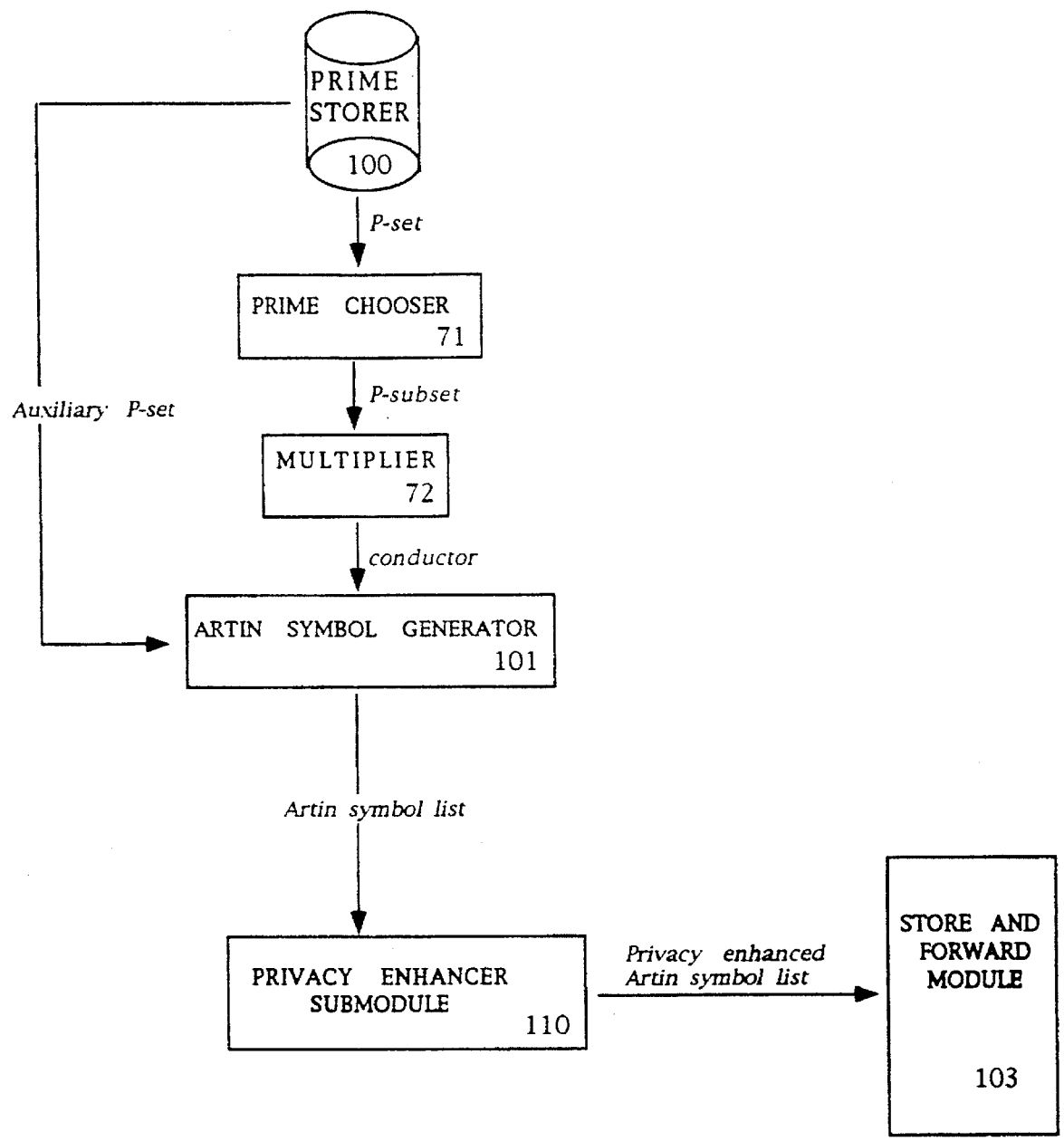

Modes of Operation:

FIG. 12 illustrates the operation of the Zeta Apparatus in Pseudorandom Sequence Generator Mode. The Prime Chooser 71 requests a set of primes (denoted P-set) from the Prime Storer 100. After receiving P-set, Prime Chooser 71 chooses a subset of P-set (denoted P-subset) and sends P-subset to the Multiplier 72. The Multiplier 72 produces from P-subset the conductor which is the product of the primes in P-subset. The conductor is sent to the Artin Symbol Generator 101 which then requests the primes Auxiliary P-set from the Prime Storer 100 and then computes from the conductor and P-set the Artin symbol list which is then sent to the Privacy Enhancer Submodule 110. The Privacy Enhancer Submodule 110 produces the Privacy enhanced Artin symbol list and sends it to the Store and Forward Module 103. The Privacy Enhancer Submodule 110 is in one of two states: ON or OFF. If it is ON, it permutes the Artin symbol list employing a one-way permutation known privately to both subsystems A, B. If it is OFF, it simply transmits the Artin symbol list to the Store and Forward Module 103.

Figure 13:
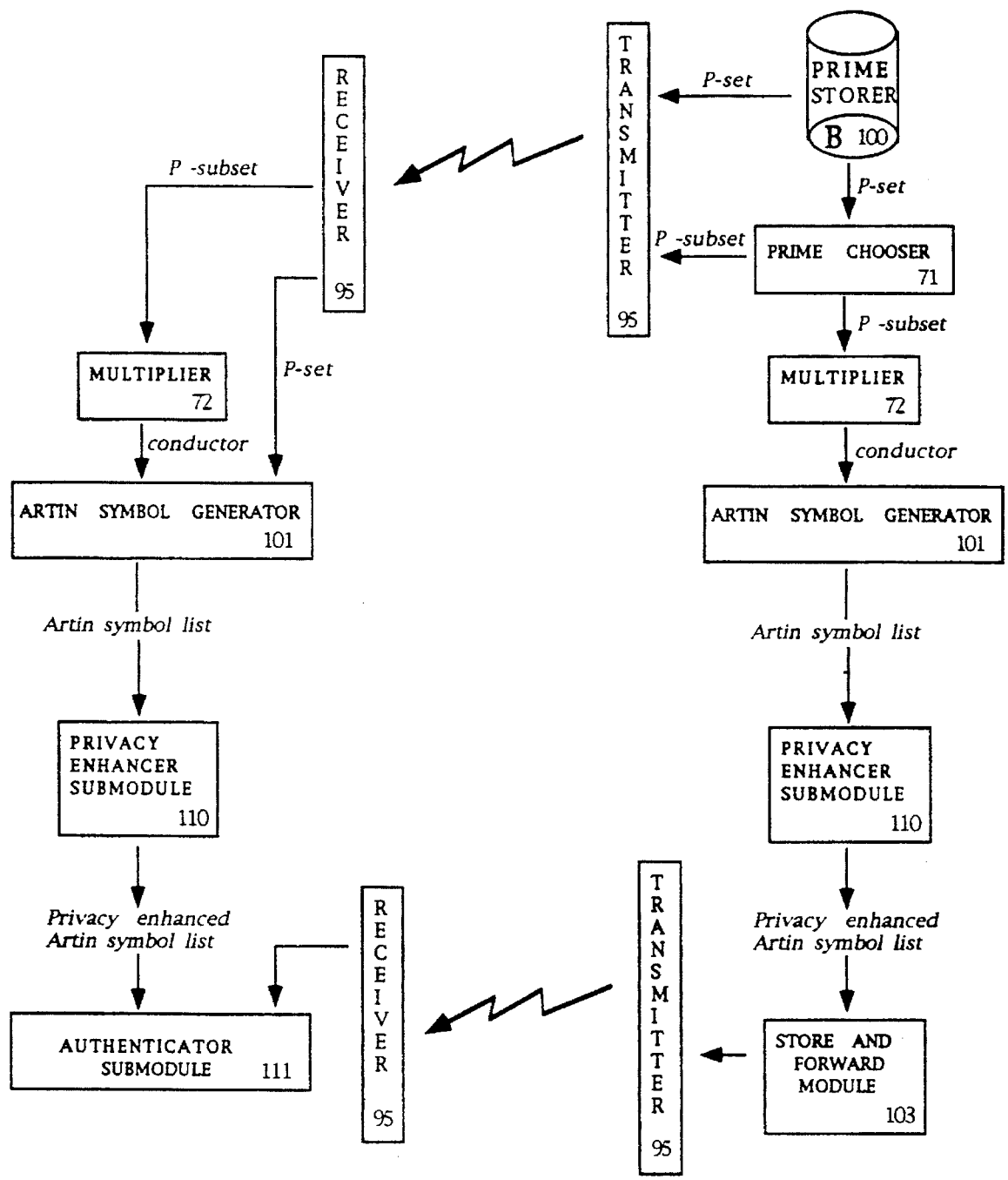
FIG. 13 shows the zeta apparatus in an authentication mode.

FIG. 13 illustrates the Zeta Apparatus in Authentication Mode. In this mode, subsystem B is in Pseudorandom Generator Mode and transmits P-set, P-subset and Privacy enhanced Artin symbol list to subsystem A which then operates as follows. Subsystem A computes from the received inputs P-set and P-subset the Privacy enhanced Artin symbol list and sends it to the Authenticator Submodule 111 which compares it to the Privacy enhanced Artin symbol list transmitted by subsystem B. If these lists agree then authentication is confirmed.

Figure 14:
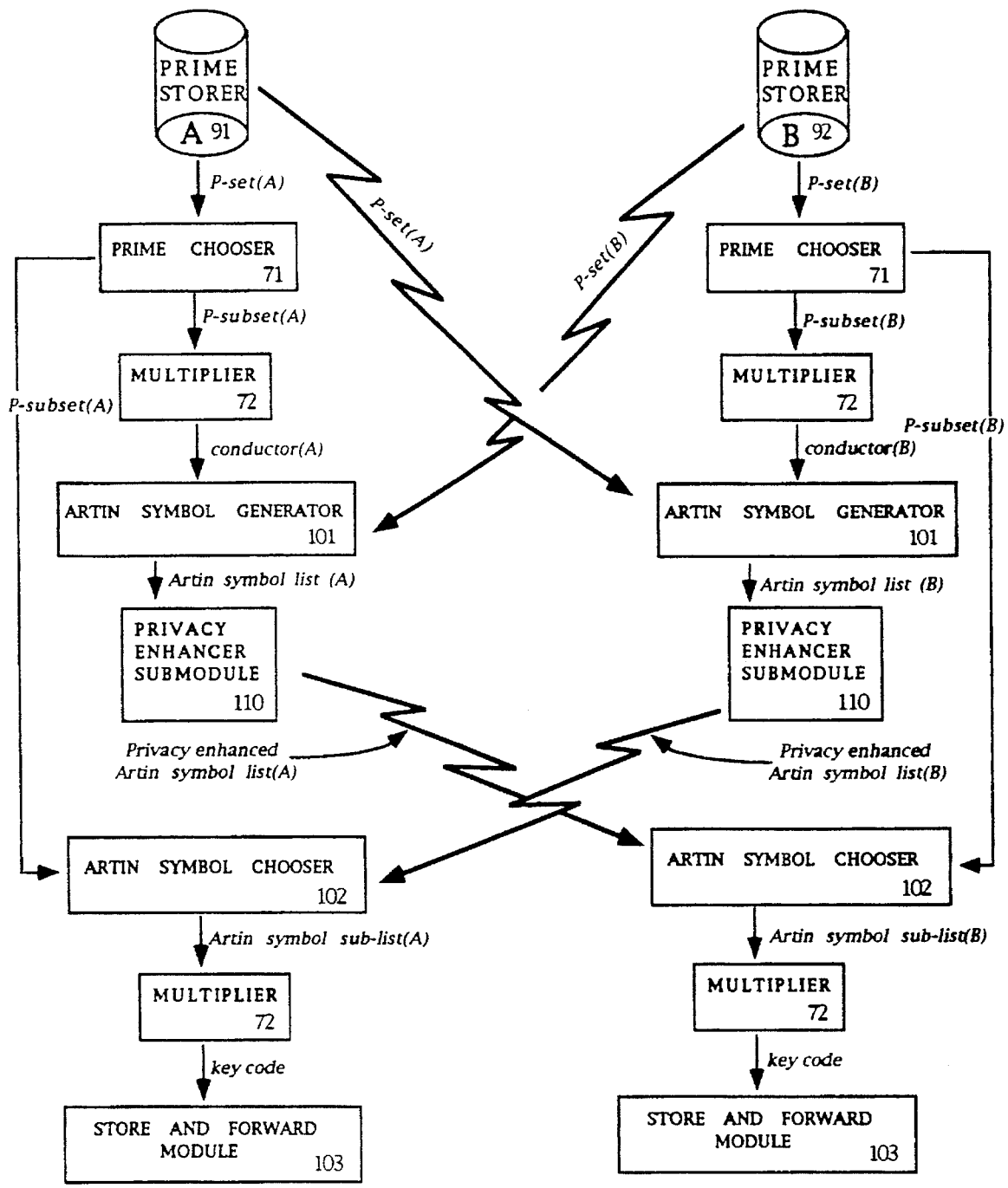
FIG. 14 shows the zeta apparatus in a key transfer mode.
Figure 15:
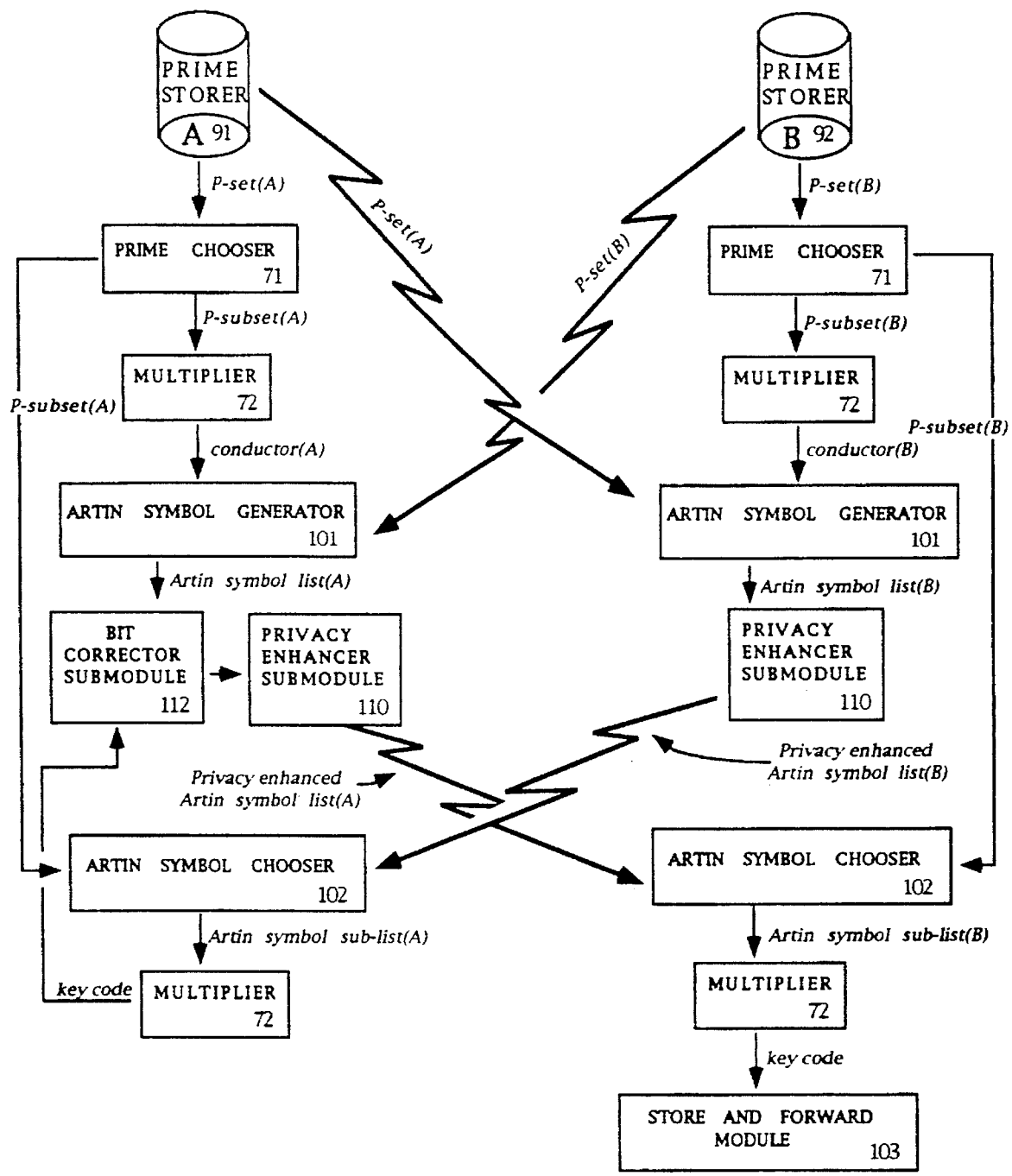
FIG. 15 shows the zeta apparatus in send-receive mode.

FIG. 14 illustrates the Zeta Apparatus in Key Transfer Mode. In this mode of operation, subsystems A, B operate symmetrically, so it is enough to restrict this description to subsystem A. In FIG. 14, Store and Forward Modules and Transmitters and Receivers are omitted in order to simplify the figure. labeled lightning bolts indicate transmissions. The Prime Chooser 71 requests a set of primes (denoted P-set(A)) from the Prime Storer 91. After receiving P-set(A), Prime Chooser 71 chooses a subset of P-set(A) (denoted P-subset(A)) and sends P-subset(A) to the Multiplier 72. The Multiplier 72 produces from P-subset(A) the conductor(A) which is the product of the primes in P-subset(A). The conductor(A) is sent to the Artin Symbol Generator 101 which then requests the primes P-set(B) (transmitted by subsystem B) from the Prime Storer 92 and then computes from the conductor(A) and P-set(B) the Artin symbol list(A) which is then sent to the Privacy Enhancer Submodule 110. The Privacy Enhancer Submodule 110 then sends Privacy enhanced Artin symbol list (A) to the transmitter which transmits this list (upon request) to the Artin Symbol Chooser 102 of subsystem B. The Prime Chooser 71 also sends P-subset(A) to the Artin Symbol Chooser 102 which then requests Privacy enhanced Artin symbol list(B) from subsystem B. Upon receiving this data, Artin Symbol Chooser 102 computes Artin symbol sublist(A) and sends this sublist to the Multiplier 72. The Multiplier 72 then multiplies the Artin symbols in Artin symbol sub-list(A) which is the key code. The key code will be identical in both subsystems and is then sent to the Store and Forward Module 103. According to an alternative configuration, P-set(A) and P-set(B) may be stored in both subsystems, generated in each subsystem according to a predetermined or specified criteria or transmitted to a subsystem from an accessible storage or generation facility. FIG. 15 illustrates the Zeta Apparatus in Send/Receive Mode. In this mode of operation, we designate that subsystem A is transmitting a bit $\alpha = \pm 1$ to subsystem B which is in Key Transfer Mode. We restrict our discussion to subsystem A. In FIG. 15, Store and Forward Modules and Transmitters and Receivers are omitted in order to simplify the figure. Labeled lightning bolts indicate transmissions. The Prime Chooser 71 requests a set of primes (denoted P-set(A)) from the Prime Storer 91. After receiving P-set(A), Prime Chooser 71 chooses a subset of P-set(A) (denoted P-subset(A)) and sends P-subset(A) to the Multiplier 72. The Multiplier 72 produces from P-subset(A) the conductor(A) which is the product of the primes in P-subset(A). The conductor(A) is sent to the Artin Symbol Generator 101 which then requests the primes P-set(B) (transmitted by subsystem B) from the Prime Storer 92 and then computes from the conductor(A) and P-set(B) the Artin symbol list(A) which is then sent to the Bit Corrector Submodule 112. Concurrently, the Prime Chooser 71 also sends P-subset(A) to the Artin Symbol Chooser 102 which then requests Privacy enhanced Artin symbol list(B) from subsystem B. Upon receiving this data, Artin Symbol Chooser 102 computes Artin symbol sub-list(A) and sends this sublist to the Multiplier 72. The Multiplier 72 then multiplies the Artin symbols in Artin symbol sub-list(A) which is the key code (which is also assumed to be a bit $\kappa = \pm 1$. The bit $\kappa$ is then sent to the Bit Corrector Submodule 112 which compares the bits $\alpha$ and $\kappa$. If $\alpha = \kappa$ then the Artin symbol list(A) is sent on to the Privacy Enhancer Submodule 110. On the other hand, if $\alpha \neq \kappa$, then the Bit Corrector Submodule 112 modifies the Artin symbol list(A) (as previously discussed in the section on the Public Key Encryption Scheme) and sends this modified Artin symbol list to the Privacy Enhancer Submodule 110. The Privacy Enhancer Submodule 110 then sends this list to the transmitter which transmits this list (upon request) to the Artin Symbol Chooser 102 of subsystem B. The privacy enhancer submodules illustrated in FIGS. 11–15 may be omitted from the respective embodiments. The privacy enhancer is an optional and advantageous feature in certain applications.

The invention is illustrated and described by way of specific embodiments. Those of ordinary skill in the art will recognize that modifications may be made without departing from the spirit of the invention and scope defined by the claims.

We claim:

1. A zeta one-way pseudorandom number generator comprising:

an abelian variety classifier responsive to a modular encoder indicator and a probability distribution factor;

a fast abelian variety generator responsive to an input key and said abelian variety classifier;

a zeta function coefficient generator responsive to a prime sequence input and said fast abelian variety generator;

a modular encoder acting under the influence of said modular encoder indicator responsive to said zeta function coefficient generator.

2. A real time authentication system comprising:

a zeta one-way pseudorandom number generator responsive to an input key and an input parameter to generate a primary zeta code;

a zeta code transformer responsive to said zeta one-way pseudorandom number generator to generate variety generation parameters;

a fast abelian variety generator responsive to said zeta code transformer variety generation parameters and connected to a zeta function coefficient generator;

an announcer responsive to an output of said zeta function coefficient generator generating secondary zeta code;

means for transmitting parameters specifying said abelian variety;

means for incrementing said input parameter.

3. A real time authentication system according to claim 2, further comprising means for regenerating secondary zeta code and for comparing to an announced zeta code based on said parameter specifying said abelian variety.

4. A distributed public key transfer system comprising:

two subsystems operating symmetrically, each subsystem is responsive to an input key;

means for selecting in each subsystem a first subset of primes from a predetermined second set of primes;

means for combining said first subset of primes responsive to said means for selecting;

means for generating an Artin L-function code table based on a second set of primes associated to the symmetric subsystem and responsive to said means for combining;

in each subsystem a code table annunciator responsive to said means for generating;

a code table receiver;

a code chooser responsive to said means for selecting and connected to said code table receiver;

means for combining chosen codes responsive to said code chooser.

5. A distributed public key transfer system according to claim 4, wherein in each subsystem means for combining said first subset of primes is a multiplier.

6. A distributed public key transfer system according to claim 5, wherein in each subsystem means for selecting a first subset of primes selects from a first set of primes exhibiting evaluated Artin symbols with a second set of primes associates with the symmetric subsystem.

7. A distributed public key transfer system according to claim 6, wherein for each subsystem the second set of primes is chosen from an algebraic number field and specified by congruence conditions determined by Artin reciprocity in said number field.

8. A distributed public key transfer system according to claim 7, wherein said algebraic number field is an ordinary rational number field and said evaluated Artin symbols are Jacobi symbols and members of said first set of primes are at least partially defined by congruence to 1(mod 4).

9. A distributed public key transfer system according to claim 8, wherein one of said sets of primes is at least partially defined by congruence to 1(mod 8) and another of said sets of primes is at least partially defined by congruence to 5(mod 8).

10. A distributed public key transfer system according to claim 9, wherein in each subsystem means for generating further comprises a Jacobi symbol generator with a conductor input connected to an output of said multiplier and a prime input responsive to said second set of primes associated to the symmetric subsystem.

11. A distributed public key transfer system according to claim 10, wherein said means for selecting is a pseudorandom selector.

12. A distributed public key transfer system according to claim 11, wherein said means for combining chosen codes is a multiplier.

13. A distributed public key transfer system according to claim 11, wherein said code table annunciator is a transmitter.

14. A distributed public key transfer system according to claim 13, wherein said transmitter is a point to point communication interface.

15. A distributed public key transfer system according to claim 13, wherein said code table annunciator is an electronic bulletin board.

16. A distributed public key transfer system according to claim 11, wherein said code table receiver further comprises a point to point communication interface.

17. A distributed public key transfer system according to claim 11, further comprising;

a pseudorandom number generator having a key input responsive to said means for combining chosen codes; and an encryption system having a plain text input, an encryption code input connected to said pseudorandom number generator, and a cipher text output.

18. A distributed public key transfer system according to claim 11, further comprising in each subsystem a selection variable designator connected to said means for selecting a predetermined number of a first set of primes, defining said predetermined number.

19. A distributed public key encryption system sending station comprising:

means for selecting a first subset of primes from a predetermined second set of primes;

means for combining said first subset of primes;

means for generating an Artin L-function code table based on a second set of primes associated with a receiving station and responsive to said means for combining;

a key receiver;

a code chooser responsive to said means for selecting and connected to said key receiver;

means for combining chosen codes responsive to said key receiver;

means for comparing a text state to a state of the output of said means for combining chosen codes and correcting an output of said means for generating when said text state differs from said output of said means for combining chosen codes;

a code transmitter responsive to said means for comparing.

20. A distributed public key encryption system according to claim 19, wherein said means for selecting, selects an odd number of primes and said means for comparing and correcting an output inverts the output when the states differ.

21. A distributed public key encryption system according to claim 19, wherein said means for combining said first subset of primes is a multiplier.

22. A distributed public key encryption system according to claim 21, wherein said means for selecting a first subset of primes selects from a first set of primes exhibiting evaluated Artin symbols with a second set of primes associated with a receiving station.

23. A distributed public key encryption system according to claim 22, wherein for each subsystem the second set of primes is chosen from an algebraic number field and specified by congruence conditions determined by Artin reciprocity in said number field.

24. A distributed public key encryption system according to claim 23, wherein said algebraic number field is an ordinary rational number field and said evaluated Artin symbols are Jacobi symbols and members of said first set of primes and said second set of primes are at least partially defined by congruence to 1(mod 4).

25. A distributed public key encryption system according to claim 24, wherein one of said sets of primes is at least partially defined by congruence to 1(mod 8) and another of said sets of primes is at least partially defined by congruence to 5 (mod 8).

26. A distributed public key encryption system according to claim 22, wherein said means for generating further comprises a Jacobi symbol generator with a conductor input connected to an output of said multiplier and a prime input responsive to said second set of primes.

27. A distributed public key encryption system according to claim 26, wherein said means for selecting is a pseudorandom selector.

28. A distributed public key encryption system according to claim 27, wherein said means for combining chosen codes is a multiplier.

29. A distributed public key encryption system according to claim 27, wherein said code table annunciator is a transmitter.

30. A distributed public key encryption system according to claim 29, wherein said transmitter is a point to point communication interface.

31. A distributed public key encryption system according to claim 29, wherein said code table annunciator is an electronic bulletin board.

32. A distributed public key encryption system according to claim 27, wherein said code table receiver further comprises a point to point communication interface.

33. A zeta one-way pseudorandom number generator method comprising the steps of classifying an abelian variety in response to a modular encoder indicator and a probability distribution factor;

generating a fast abelian variety from an input key and an abelian variety class;

generating a zeta function coefficient from a prime sequence and the abelian variety;

reducing the zeta function coefficients by a modular function; and encoding information with pseudorandom numbers created by said step of reducing.

34. A real time authentication method comprising the steps of:

utilize a zeta one-way function to generate a pseudorandom number sequence in response to an input key and an input parameter to yield a primary zeta code; transform the primary zeta code to generate variety generation parameters;

generate an abelian variety from said variety generation parameters;

generate a secondary zeta code from the variety parameters;

announce the secondary zeta code;

transmit the parameters specifying said abelian variety;

increment the input key.

35. A method according to claim 34, further comprising the step of regenerating the secondary zeta code from the parameter specifying said abelian variety and comparing the announced secondary zeta code to the regenerated secondary zeta code.

36. A distributed public key transfer method comprising the steps of:

selecting a first subset of primes from a predetermined second set of primes;

combining said first subset of primes;

generating an Artin L-function code table based on a second set of primes associated to a second subsystem;

announcing the code table;

receiving a second code table generated by an associated system;

choosing codes from the second code table corresponding to the first subset of primes;

combining chosen codes.

37. A distributed public key transfer method according to claim wherein the step of combining said first subset of primes is accomplished by multiplying members of said first subset of primes.

38. A distributed public key transfer method according to claim 37, wherein the step of selecting a first subset of primes selects from a first set of primes exhibiting evaluated Artin symbols with a second set of primes associated with the second subsystem.

39. A distributed public key transfer method according to claim 38, wherein the second set of primes is chosen from an algebraic number field and specified by congruence conditions determined by Artin reciprocity in said number field.

40. A distributed public key transfer method according to claim 39, wherein said algebraic number field is an ordinary rational number field and said evaluated Artin symbols are Jacobi symbols and members of said first set primes are at least partially defined by congruence to 1(mod 4).

41. A distributed public key transfer method according to claim 40, wherein one of said sets of primes is at least partially defined by congruence to 1(mod 8) and another of said sets of primes is at least partially defined by congruence to 5(mod 8).

42. A distributed public key transfer method according to claim 41, wherein said step of generating further comprises generating a series of Jacobi symbols from said second set of primes associated to the second subsystem with a conductor specified by the multiplied first subset of primes.

43. A distributed public key transfer method according to claim 42, wherein the step of selecting is a pseudorandom selection.

44. A distributed public key transfer method according to claim 43, wherein the step of combining chosen codes multiplies the chosen codes.

45. A distributed public key transfer method according to claim 43, further comprising;

generating a pseudorandom number sequence from a key input created by the step of combining chosen codes; and encrypting a plain text with the pseudorandom, an encryption code number sequence.

46. A distributed public key encryption sending method comprising the steps of:

selecting a first subset of primes from a predetermined second set of primes;

combining said first subset of primes;

generating an Artin L-function code table based on a second set of primes associated with a receiving station from the combined first subset of primes;

acquiring an encryption key;

choosing codes from said encryption key corresponding to said first subset of codes;

combining chosen codes;

comparing a text state to a state of the combined chosen codes and correcting the Artin L-function code table when said text differs from said state of the combined codes;

transmitting the corrected code table.

47. A distributed public key encryption method according to claim 46, wherein said step of selecting selects an odd number of primes and said steps of comparing and correcting inverts the output of the code table when the states differ.

48. A distributed public key encryption method according to claim 46, wherein said step of combining first subset of primes multiplies.

49. A distributed public key encryption method according to claim 48, wherein said step of selecting a first subset of primes selects from a first set of primes exhibiting evaluated Artin symbols with a second set of primes associated with a receiving station.

50. A distributed public key encryption method according to claim 49, wherein the second set of primes is chosen from an algebraic number field and specified by congruence conditions determined by Artin reciprocity in said number field.

51. A distributed public key encryption method according to claim 50, wherein said algebraic number field is an ordinary rational number field and said evaluated Artin symbols are Jacobi symbols and members of said first set of primes and said second set of primes are at least partially defined by congruence to 1(mod 4).

52. A distributed public key encryption method according to claim 51, wherein one of said sets of primes is at least partially defined by congruence to 1(mod 8) and another of said sets of primes is at least partially defined by congruence of 5(mod 8).

53. A distributed public key encryption method according to claim 49, wherein said step of generating generates Jacobi symbols from the second set of primes and the multiplied primes as a conductor.

54. A distributed public key encryption method according to claim 53, wherein said step selecting is a pseudorandom selection.

55. A distributed public key encryption method according to claim 54, wherein said step of combining chosen codes multiplies.

* * * * *